US 11,574,378 B2

United States Patent
Li et al.

(10) Patent No.: US 11,574,378 B2
(45) Date of Patent: Feb. 7, 2023

(54) OPTIMIZING PROVIDER COMPUTING DEVICE WAIT TIME PERIODS ASSOCIATED WITH TRANSPORTATION REQUESTS

(71) Applicant: Lyft, Inc., San Francisco, CA (US)

(72) Inventors: Man Geen Harold Li, New York, NY (US); Alex Collier Mazure, San Francisco, CA (US); Mohammad Ali Motie Share, San Francisco, CA (US); Jimmy Young, San Francisco, CA (US); Mu Xia, Sunnyvale, CA (US); Kevin Wang, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 174 days.

(21) Appl. No.: 16/657,229

(22) Filed: Oct. 18, 2019

(65) Prior Publication Data

US 2021/0118079 A1    Apr. 22, 2021

(51) Int. Cl.
*G06Q 30/02*  (2012.01)
*G06Q 50/30*  (2012.01)
(Continued)

(52) U.S. Cl.
CPC .......... *G06Q 50/30* (2013.01); *G06N 3/0472* (2013.01); *G06Q 10/047* (2013.01);
(Continued)

(58) Field of Classification Search
CPC .............. G06Q 50/30; G06Q 30/0185; G06Q 30/0205; G06Q 30/0284; G06Q 10/047; H04W 4/029; G06N 3/0472
(Continued)

(56) References Cited

U.S. PATENT DOCUMENTS

| 2008/0195428 A1* | 8/2008 | O'Sullivan | ............ | G08G 1/123 |
| | | | | 705/6 |
| 2016/0019728 A1* | 1/2016 | Petrie | ..................... | G06Q 10/02 |
| | | | | 705/5 |

(Continued)

FOREIGN PATENT DOCUMENTS

CN    108960976 A   * 12/2018  ......... G06Q 30/0637

OTHER PUBLICATIONS

UberPOOL Should Be Effortless for Everyone, Dec. 12, 20016, uber.com, 6 pages (Year: 2016).*

(Continued)

*Primary Examiner* — Shannon S Campbell
*Assistant Examiner* — Freda A Nelson
(74) *Attorney, Agent, or Firm* — Keller Preece PLLC

(57) ABSTRACT

The present application discloses an improved wait time optimization system, and corresponding methods and computer-readable media. According to disclosed embodiments, the wait time optimization system generates a customized wait time period for a provider computing device that has arrived at a pickup location associated with a matched transportation request. Upon the expiration of the customized wait time period, the wait time optimization system selectively enables a cancellation option for the provider computing device that enables a user of the provider computing device to cancel the transportation request, thereby releasing the provider computing device for a new transportation request match.

20 Claims, 15 Drawing Sheets

(51) Int. Cl.
*G06N 3/04* (2006.01)
*G06Q 30/00* (2012.01)
*H04W 4/029* (2018.01)
*G06Q 10/04* (2012.01)

(52) U.S. Cl.
CPC ..... *G06Q 30/0185* (2013.01); *G06Q 30/0205* (2013.01); *G06Q 30/0284* (2013.01); *H04W 4/029* (2018.02)

(58) Field of Classification Search
USPC .................................................. 705/5, 13, 6
See application file for complete search history.

(56) References Cited

U.S. PATENT DOCUMENTS

2017/0243492 A1* 8/2017 Lambert ............ G01C 21/3438
2018/0157984 A1* 6/2018 O'Herlihy .............. G06N 20/00
2020/0112570 A1* 4/2020 Yang ..................... H04W 12/63

OTHER PUBLICATIONS

Natt Garun, UberPool now has a timer so you don't have to wait for late carpool mates: Ain't nobody got time for that, Dec. 12, 2016, 1:17pm EST, the verge.com, 4 pages. (Year: 2016).*
Kodyhead, "Countdown timer on Uber" May 6, 2017, uberpeople.net, 5 pages. (Year: 2017).*
Dogra, Sarthak, "Uber Aims to Boost UberPOOL in 2017", Jan. 5, 2017, 2 pages (Year: 2017).*
Guocheng Xie and Yanjun Huang, Engineering Uber Predictions in Real Time with ELK Jul. 24, 2017 / Global, uber.com, Uber blog, 12 pages (Year: 2017).*
Turakhia, Chintan, "Engineering More Reliable Transportation with Machine Learning and AI at Uber", Nov. 10, 2017; uber.com, Uber Blog, 19 pages (Year: 2017).*

* cited by examiner

OPTIMIZING PROVIDER COMPUTING DEVICE WAIT TIME PERIODS ASSOCIATED WITH TRANSPORTATION REQUESTS

BACKGROUND

In recent years, the popularity and usage of on-demand transportation matching systems have steadily increased. Indeed, the proliferation of web and mobile applications enable requesting devices to submit transportation requests via on-demand transportation matching systems and identify available provider devices that can provide transportation services from one geographic location to another. However, conventional transportation matching systems suffer from a number of disadvantages with respect to accuracy and efficiency of implementing computing systems.

For example, conventional transportation systems are often inefficient and inflexible, resulting in unnecessary cancellations and corresponding wasted system resources. For example, conventional transportation systems typically allow transportation providers to cancel pending transportation requests before transportation requestors are picked up. To illustrate, within conventional systems, a transportation provider may cancel a transportation request after waiting a static amount of time even when the transportation requestor is nearby and ready or nearly ready for pickup. Such an unnecessary cancellation leads to, among other things, the system having to process an additional transportation request from the requestor and having to match the provider to a new transportation request, not to mention the inconvenience experienced by requestors and providers alike.

The foregoing problems are compounded when transportation providers attempt to fraudulently collect cancellation fees without providing transportation services. As a result, the conventional systems are unable to efficiently position transportation providers. Furthermore, it can lead to a backlog of transportation requests, resulting in higher cancellation rates and slower average arrival times.

Additionally, even in situations where it is obvious that a requestor has no intention of meeting a transportation provider at a pickup location (e.g., if the requestor is moving away from the pickup location), conventional transportation systems still inflexibly require the transportation provider to wait a static amount of time before cancelling the transportation request. This inflexibility again causes results in an inefficient use of system resources and a poor user experience for transportation providers.

These along with additional problems and issues exist with regard to conventional transportation matching systems.

BRIEF DESCRIPTION OF THE DRAWINGS

The detailed description is described with reference to the accompanying drawings in which.

DETAILED DESCRIPTION

Figure 1:
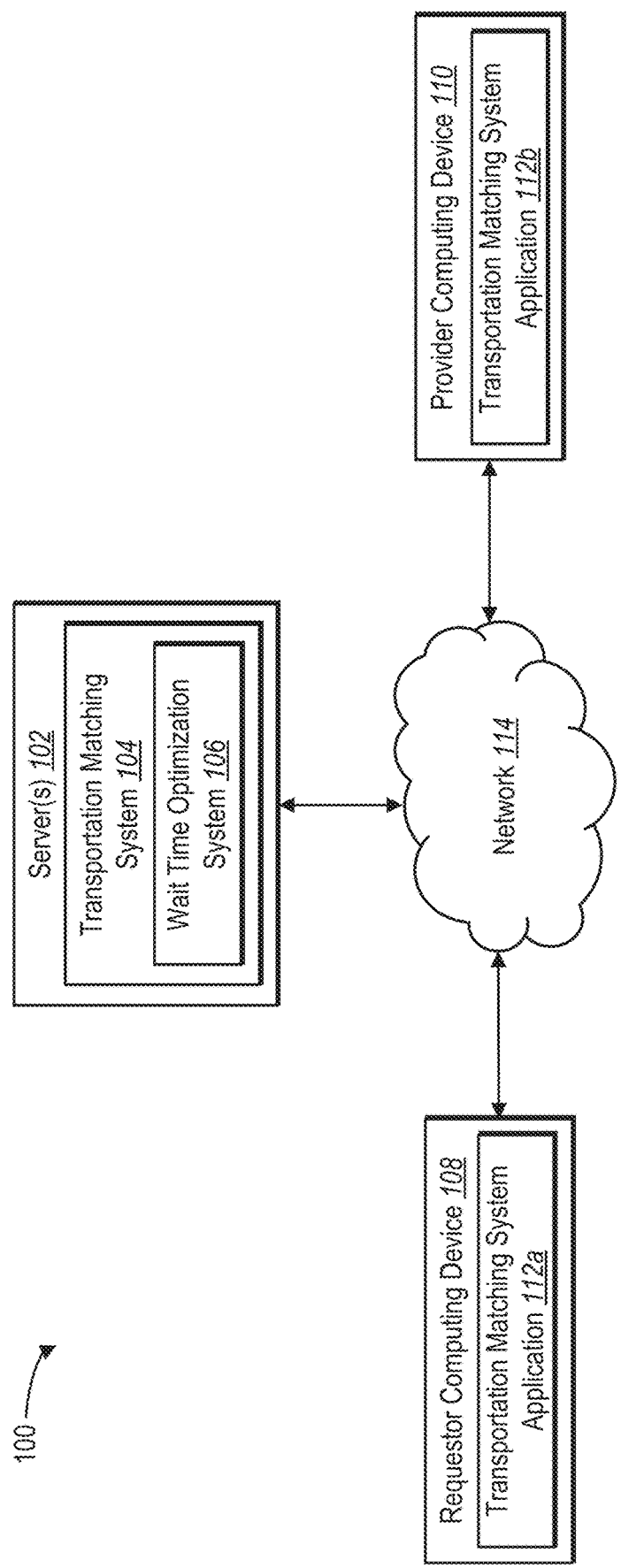
FIG. 1 illustrates an example environment in which a wait time optimization system operates in accordance with one or more embodiments.

One or more embodiments of the present disclosure includes a wait time optimization system that generates a customized wait time period for a provider computing device associated with a matched transportation request. For example, for a provider computing device that initiates a wait time period (e.g., has arrived at a pickup location associated with a received transportation request) the wait time optimization system can utilize machine learning models to determine probabilities that a pickup will occur within a range of times. The wait time optimization system can then utilize these determined probabilities to optimize a customized wait time period associated with the transportation request. The wait time optimization system can provide an option to cancel the transportation request (e.g., a "no-show" option) to the provider based on the customized wait time period. In response to the provider selecting the cancellation option, the wait time optimization system can cancel the transportation request, such that the provider is released to be matched to another transportation request.

To further illustrate, in an effort to ensure providers wait an appropriate amount of time for requestor pickups, the wait time optimization system utilizes a combination of machine learning and algorithmic optimization to generate a customized wait time period for a provider computing device that has matched with a transportation request. For example, in response to receiving a transportation request from a requestor computing device, a transportation matching system matches the received transportation request to an available and appropriate provider computing device. The provider can accept the match via the provider computing device and can position themselves at a pickup location specified by the transportation request.

In many instances, the requestor may have submitted the transportation request even though not physically present at the specified pickup location. For example, the requestor may have submitted a transportation request from their work office that specified a pickup location at a street corner outside their building. Often, requestors submit transportation requests prior to actually arriving at the specified pickup location hoping to arrive at the pickup location near or at the same time that the provider arrives at the pickup location.

A problem arises, however, when requestors take too long to get to a specified pickup location; or fail to arrive at all. For example, after a provider accepts a transportation request match and positions themselves at the specified pickup location, every moment spent waiting for the requestor to arrive is value lost to the provider and to the transportation matching system. In some instances, the value of the transportation request may outweigh the value lost while the provider waits for a certain time period.

Accordingly, in one or more embodiments, the wait time optimization system can utilize real-time and historical features to generate a customized wait time period for the providers. For example, in response to determining that a provider has arrived at a pickup location associated with a transportation request, the wait time optimization system can identify features associated with the transportation request. In one or more embodiments, the wait time optimization system can identify real-time features associated with the transportation request such as, but not limited to, the day of the week, the time of day, the current season and weather, the provider's real-time location, the requestor's real-time location, the remaining battery life of the requestor computing device, the speed and direction of movement associated with the requestor computing device, and a real-time distance between the requestor computing device and the provider computing device. The wait time optimization system can also identify historical features associated with the transportation request such as, but not limited to, a transportation matching system history associated with the requestor computing device, a transportation matching system history associated with the provider computing device, and a transportation matching system history associated with the pickup location.

In one or more embodiments, the wait time optimization system utilizes the identified real-time and historical features in connection with a pickup probability neural network to determine various pickup probabilities associated with the transportation request. For example, the wait time optimization system can utilize the identified real-time and historical features in connection with a pickup probability neural network to determine a probability that a pickup will occur within a particular wait time period (e.g., five minutes) that can be standard to the system or customized on a per-case basis. The wait time optimization system can further utilize the identified real-time and historical features in connection with a pickup probability neural network to determine a probability that a pickup will occur within an incremental wait time period beyond the standard wait time period (e.g., five and a half minutes).

In at least one embodiment, the wait time optimization system can utilize these determined probabilities in connection with other information to optimize a metric that indicates transportation match efficiency. For example, the wait time optimization system can determine a value associated with the provider waiting the additional time period by multiplying the difference between the probability that a pickup will occur within a standard wait time period and the probability that a pickup will occur within an incremental wait time period by a value associated with the transportation request. The wait time optimization system can then subtract from that total a cost associated with the transportation request in order to determine an overall value associated with the provider waiting an additional amount of time beyond the standard wait time period.

In one or more embodiments, the wait time optimization system generates a customized wait time period for the transportation request based on the metric that indicates transportation match efficiency. For example, if a value associated with the provider continuing to wait (e.g., based on an increased probability of a pickup occurring if the provider waits an additional amount of time beyond a standard wait time period) exceeds a corresponding cost of continuing to wait (e.g., actual and/or opportunity cost to the provider and/or system resulting from provider waiting an additional amount of time beyond a standard wait time period), the wait time optimization system can customize the wait time period accordingly (e.g., by adding additional time to a standard wait time period). In some cases, the wait time optimization system customizes the wait time period to correspond to a target probability (e.g., target pickup probability). To illustrate, the wait time optimization system can identify a wait time period that corresponds to a 90% or 95% pickup probability and use the identified wait time period as the customized wait time period. The resulting customized wait time period may be shorter or longer than a standard wait time period. Accordingly, the wait time optimization system can increase overall efficiency of the system by setting the wait time periods based on when a pickup is most likely to occur, rather than fixing each wait time period to a standard that doesn't account for the specific features of a given situation. Furthermore, the wait time optimization system can dynamically update a customized wait time period based on real-time changes in features associated with a matched transportation request. Accordingly, as the system gathers data in real time, it can further customize the wait time period (e.g., based on updated pickup probabilities resulting from changes in the data).

In at least one embodiment, the wait time optimization system can further cause the provider computing device to selectively enable a no-show option in accordance with a customized wait time period. For example, the wait time optimization system can selectively enable a no-show option on a provider client device that informs the provider that they can either "no-show" the requestor or wait an additional thirty seconds for the requestor to arrive. To illustrate, in at least one embodiment, by selecting the "no-show" option, the provider indicates to the wait time optimization system that the requestor has not arrived at the pickup location within the allotted amount of time, and that the transportation match between the requestor and the provider should be canceled. In response to a detected selection of the no-show option, the wait time optimization system can cancel the transportation request. Conversely, in response to a detected selection of a "wait thirty seconds" option, the wait time optimization system can extend the wait time period associated with the transportation request.

Overall, the wait time optimization system operates under certain heuristics meant to improve the transportation matching system for providers. For example, in some embodiments the wait time optimization system provides shorter customized wait time periods when 1) the requestor is unlikely to arrive at the pickup location within a given wait time period, 2) the provider is trying to complete a higher number of transportation request matches, and/or 3) the transportation request match is part of a shared ride with another requestor. Additionally, in some embodiments, the wait time optimization system provides longer customized wait time periods when 1) fulfilling the transportation request will not adversely affect system efficiency, and/or 2) the requestor is very likely to arrive at the pickup location soon.

As such, the wait time optimization system provides many advantages and benefits over conventional transportation systems. For example, by generating a customized wait time period for a provider computing device in association with a transportation request, the wait time optimization system efficiently utilizes computing resources. To illustrate, rather than allowing provider computing devices to idle for a static amount of time at a pickup location waiting for a requestor who is unlikely to arrive, the wait time optimization system may generate a shorter customized wait time period that enables the provider to move on to the next transportation request match more quickly should the requestor fail to arrive.

Additionally, by generating the customized wait time period, the wait time optimization system provides a flexible solution to providers. For example, it may be not only lucrative for a provider to wait longer than a static wait time period for a higher-value transportation request, but it may also be beneficial for system efficiency for the provider to wait longer as well (e.g., by avoiding the computing resources required to cancel and re-match a transportation request). Conversely, it may adversely impactful for the provider to wait a full static wait time period for a transportation request that is unlikely to be fulfilled. Accordingly, the wait time optimization system flexibly provides a customized wait time period that takes into account multiple factors and pickup probabilities in order to maximize value for the provider and the transportation matching system.

Moreover, by providing the customized wait time period to a provider computing device, the wait time optimization system utilizes providers more accurately than conventional systems. For example, rather than letting all providers wait the same static amount of time for their matched requestors to arrive at a pickup location, the wait time optimization system encourages providers to wait only as long as a requestor is likely to arrive at the pickup location. This, in turn, enables the transportation matching system to more accurately move and position providers within a geographic area in order to meet transportation demands. Furthermore, the disclosed optimization system reduces the number of unnecessary cancelations and re-submitted transportation requests, thereby allowing the transportation system to more efficiently handle a given number of transportation requests using a lesser amount of computing resources.

As illustrated by the foregoing discussion, the present disclosure utilizes a variety of terms to describe features and advantages of the wait time optimization system. For example, a "requestor" refers to a transportation matching system user who requests transportation by way of a requestor computing device. For example, the requestor computing device can be a personal computing device (e.g., a mobile computing device such as a smartphone, a smart wearable, a tablet) installed with a transportation matching system application.

As used herein, a "transportation request" refers to a request for transportation received by the transportation matching system from a transportation matching system application installed on a requestor computing device. In one or more embodiments, a transportation request includes a pickup location, and a destination location specified by the requestor. In at least one embodiment, the transportation can also include account information (e.g., an account identifier) associated with the requestor.

As used herein, a "provider" refers to a transportation matching system user who provides transportation using a vehicle. For example, a provider receives transportation request matches, wait time information, routing information, and requestor information from the transportation matching system via a transportation matching system application installed on a provider computing device associated with the provider. As with a requestor computing device, the provider computing device can be a personal computing device such as smart phone. In some embodiments, providers may include non-human driven autonomous vehicles that are configured to perform transportation completely without or with very little direction or interaction from a human driver.

In such cases, the provider computing device may include a computing system of the autonomous vehicle that is configured to interface with the transportation matching system.

As used herein, a "pickup location" refers to a location where the provider engages with a requestor for transportation services (e.g., where the provider can park or idle their car in order for a requestor to get into the car). In one or more embodiments, a pickup location includes one or more pickup positions. As used herein, a pickup location's number of "pickup positions" refers to the vehicular capacity of the pickup location. For example, a pickup location at an airport may include multiple pickup positions. Other pickup locations may include a single pickup position.

As used herein, a "standard pickup wait time period" or "standard wait time period" refers to a period of time that starts in response to the transportation matching system determining that a provider computing device has arrived at a pickup location and ends when the requestor computing device arrives at the pickup location (e.g., the requestor gets into the provider's car). For example, as used herein, an "incremental wait time period" can refer to a period of time that starts at the end of the standard pickup wait time period and ends after a predetermined amount of time, assuming that the pickup does not occur within the standard pickup wait time period or the incremental wait time period. Additionally or alternatively, an incremental wait time period can be a negative amount of time that effectively shortens the standard pickup wait time period. For example, an incremental wait time period can be negative twenty seconds that results in a standard pickup wait time period of three hundred seconds being shortened to two hundred and eighty seconds.

As used herein, a "customized wait time period" refers to a period of time for a provider and customized by the wait time optimization system to factors unique to a particular transportation match request. The customized wait time period may be longer or shorter than a standard wait time period. Furthermore, in some embodiments, a customized wait time period can dynamically change/update a customized wait time period in real time based on changes in data and/or calculated metrics (e.g., pickup probabilities) corresponding to a matched transportation request.

As will be discussed in greater detail below, the wait time optimization system can determine wait time periods based on wait time-based pickup probabilities. For example, a "wait time-based pickup probability" or "pickup probability" refers to a calculated metric that indicates the likelihood that a successful pickup will occur in a particular wait time (e.g., a standard pickup wait time period, an incremental wait time period). The wait time optimization system can determine wait time-based pickup probabilities utilizing a machine learning model trained with historical ground truth data in order to determine pickup probabilities associated with new wait times.

To further illustrate, if a change in location of a requestor computing device indicates that the requestor is unlikely to arrive at the pickup location within a reasonable time, the wait time optimization system can dynamically shorten the customized wait time period (or cancel it completely) to allow the provider to cancel the transportation request sooner. Alternatively, as another illustrative example, if a provider computing device moves away from a pickup location to prevent a requestor from being picked up before expiration of the wait time period, the wait time optimization system may lengthen the customized wait time period and/or pause a progression of the customized wait time period, to prevent the provider from being able to cancel the transportation request without providing the requestor a reasonable opportunity of being picked up. The wait time optimization system can further customize, pause, and/or cancel a wait time period based on any other features associated with a transportation request.

As used herein, a "no-show option" refers to a selectable user interface element enabled within a display of a provider computing device upon the expiration of a customized wait time period. As mentioned above, the wait time optimization system can selectively enable (e.g., by sending corresponding instructions to a provider computing device) the no-show option based on customized wait time periods and/or other data associated with a corresponding transportation request. In response to a detected selection of a no-show option, the transportation matching system may cancel the transportation request match between the provider computing device and the requestor computing device. In at least one embodiment, the practical effect of canceling the transportation request match is that the transportation matching system releases the provider computing device back into the pool of available provider computing devices, and the requestor must submit another transportation request.

As used herein, the term "neural network" refers to a machine learning model that can be tuned (e.g., trained) based on inputs to approximate unknown functions. In particular, the term neural network can include a model of interconnected artificial neurons (or layers) that communicate and learn to approximate complex functions and generate outputs based on a plurality of inputs provided to the model. In particular, a neural network includes a computer-implemented algorithm that implements deep learning techniques to analyze input (e.g., training input encoded as a neural network input vector) to make predictions and that improves in accuracy by comparing generated predictions against ground truth data and modifying internal parameters for subsequent predictions. In some embodiments, a neural network can employ supervised learning, while in other embodiments a neural network can employ unsupervised learning or reinforced learning. Examples of neural networks include deep convolutional neural networks, decision trees, generative adversarial neural networks, and recurrent neural networks.

Relatedly, the term "train" refers to utilizing information to tune or teach a neural network. The term "training" (used as an adjective or descriptor, such as "training data") refers to information or data utilized to tune or teach the neural network. In some embodiments, the wait time optimization system trains a pickup probability neural network to generate pickup probabilities based on respective training data.

FIG. 1 illustrates an example environment 100 for the wait time optimization system 106 including the requestor computing device 108 and the provider computing device 110. As shown, in one or more embodiments, the wait time optimization system 106 is implemented by the transportation matching system 104 hosted on one or more server(s) 102. As further shown in FIG. 1, the requestor computing device 108 and the provider computing device 110 can communicate with the transportation matching system 104 via the transportation matching system application 112b across the network 114.

In one or more embodiments, the network 114 may include one or more networks and may use one or more communication platforms or technologies suitable for transmitting data and/or communication signals. In one or more embodiments, the network 114 includes a cellular network. Alternatively, the network 114 can include the Internet or World Wide Web. Additionally or alternatively, the network 114 can include various other types of networks that use various communication technologies and protocols, such as a corporate intranet, a virtual private network ("VPN"), a local area network ("LAN"), a wireless local network ("WLAN"), a wide area network ("WAN"), a metropolitan area network ("MAN"), or a combination of two or more such networks.

As further illustrated in FIG. 1, each of the requestor computing device 108 and the provider computing device 110 include the transportation matching system application 112a, 112b. In one or more embodiments, the transportation matching system application 112a enables the user of the requestor computing device 108 and the user of the provider computing device 110 to interact with features of the transportation matching system 104. For example, requestors can configure and send transportation requests, and can receive matching notifications via the transportation matching system application 112a installed on the requestor computing device 108. Providers can receive movement instructions and match notifications via the transportation matching system application 112b installed on the provider computing device 110. In at least one embodiment, the transportation matching system application 112b can include features specific to requestors or features specific to providers.

In at least one embodiment, the requestor computing device 108 sends a transportation request to the transportation matching system 104. As mentioned above, a "transportation request" refers to information provided by the transportation matching system application 112a installed on the requestor computing device 108 to match transportation requests to the provider computing device 110. In typical contexts, the transportation matching system 104 receives a transportation request from the transportation matching system application 112a installed on the requestor computing device 108 (e.g., a mobile application for requestor) and utilizes the information provided in the transportation request to match the request to the provider computing device 110. For example, under typical contexts, the transportation matching system 104 matches the transportation request to the provider computing device 110 based on: proximity of the provider computing device 110 to a specified pickup location, provider ratings and preferences, and the specified destination location.

Although the components 102-112 are described with reference to FIG. 1 as being separate, in additional embodiments, any of the components 102-112 may be combined. For example, some or all of the features and functionality of the wait time optimization system 106 may be included in the transportation matching system application 112. Additionally, some or all of the features and functionality of the transportation matching system 104 may be included in the transportation matching system application 112. Moreover, some or all of the features and functionality of the wait time optimization system 106 may be incorporated into the transportation matching system 104.

Figure 2:
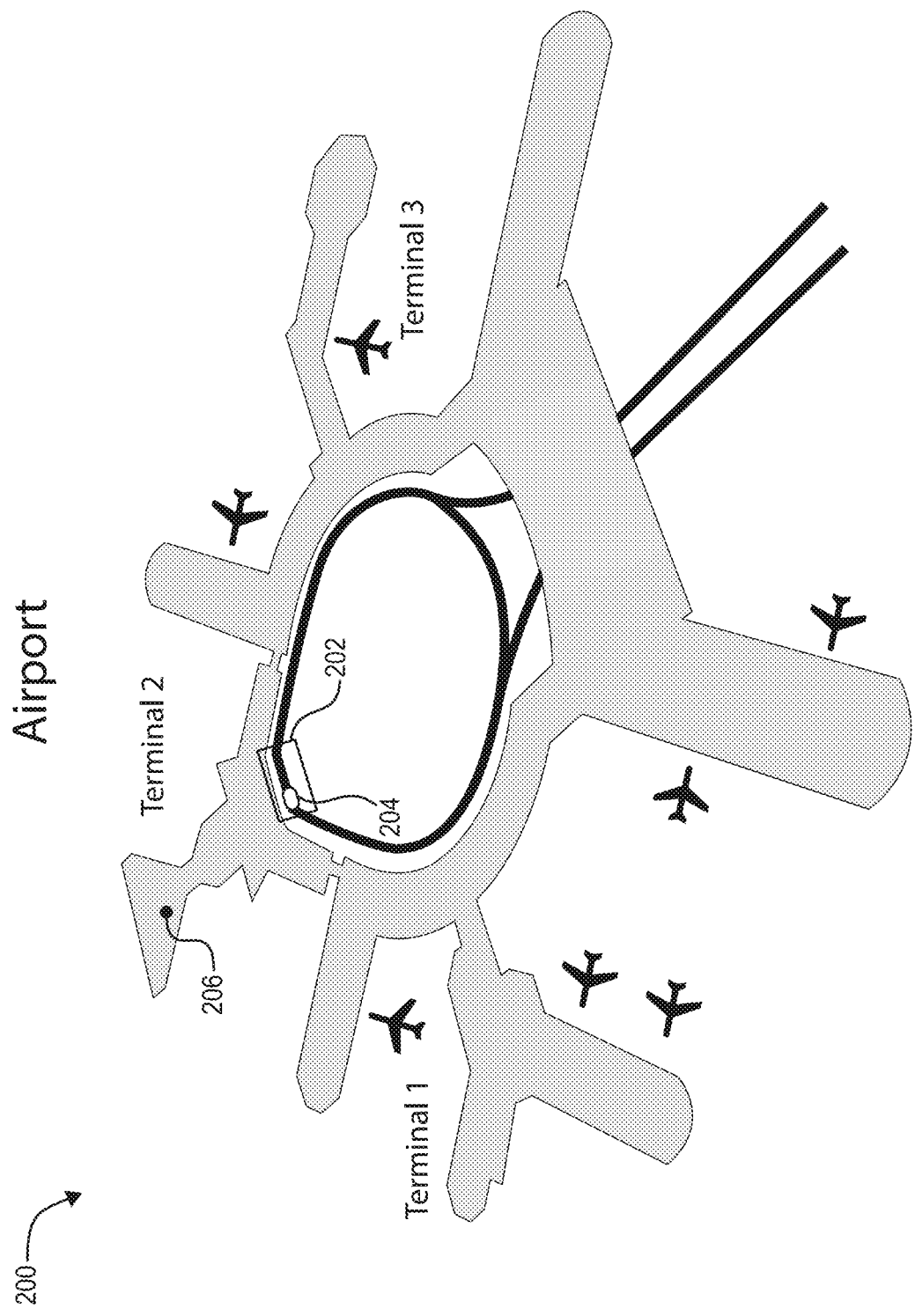
FIG. 2 illustrates an overview of an example venue in accordance with one or more embodiments.

FIG. 2 illustrates an example overview of the features and functionality of the wait time optimization system 106 in connection with a particular venue 200. For example, as shown in FIG. 2, the particular venue 200 is an airport. In one or more embodiments, the venue 200 includes a pickup location 202. As shown in FIG. 2, a requestor computing device 206 (e.g., as with the requestor computing device 108 in FIG. 1) can submit a transportation request to the transportation matching system 104 prior to arriving at the pickup location 202 associated with the venue 200. In response to receiving the transportation request, the transportation matching system 104 can match the request to the provider computing device 204 (e.g., as with the provider computing device 110 in FIG. 1), associated with a provider driving a provider-vehicle prior to the provider computing device 204 arriving at the pickup location 202.

In one or more embodiments, due to various constraints (e.g., vehicle traffic surrounding the venue 200, busy crowds within the venue 200, requestor distractions), the requestor computing device 206 and the provider computing device 204 may not arrive at the pickup location 202 at the same time. For example, as shown in FIG. 2, if the requestor computing device 206 sends a transportation request immediately upon landing, the transportation matching system 104 may match the request to the provider computing device 204 in enough time that the provider computing device 204 arrives at the pickup location 202 when the requestor computing device 206 is still a distance away from the pickup location 202.

In that scenario, the wait time optimization system 106 can generate a customized wait time period for the provider computing device 204. For example, in at least one embodiment, upon determining that the provider computing device 204 has arrived at the pickup location 202 associated with the venue 200, the wait time optimization system 106 can extract features associated with the requestor computing device 206, the provider computing device 204, the pickup location 202, and the transportation request. For example, the wait time optimization system 106 can extract features including, but not limited to, a coordinate location of a requested pickup location, a region (e.g., a geohash region) associated with a requested pickup location, a requested pickup location selection method, a local time of day of the transportation request (e.g., an hour of the day in a respective time zone), a shifted time of day (e.g., an hour of the day in the respective time zone plus 12 and divided by 24), historical walking distances associated with prior transportation requests and the pickup location 202, prior transportation requests made by the requestor computing device 206 relative to the pickup location 202 and other locations, prior transportation requests fulfilled by the provider computing device 204 relative to the pickup location 202 and other pickup locations, current location information associated with the requestor computing device 206 and the provider computing device 204, current speed and direction of travel associated with the requestor computing device 206 and the provider computing device 204, current weather and traffic conditions at the pickup location 202, event information associated with the pickup location 202 (e.g., a sporting event, a concert, a parade, etc.), a mode of transportation included in the transportation request, and/or whether the transportation request is for a shared versus an un-shared ride. Then, based on these extracted features, the wait time optimization system 106 can determine pickup probabilities associated with various ranges of time in order to generate a customized wait time period for the provider computing device 204. This process is described in greater detail below with reference to FIG. 3.

After generating a customized wait time period for the provider computing device 204, the wait time optimization system 106 can determine whether to provide a no-show option to the provider computing device 204. For example, in one or more embodiments, the transportation matching system 104 operates under the expectation that a provider computing device will wait after arriving at a pickup location for a particular time period in order to accommodate a requestor. In at least one embodiment, the transportation matching system 104 can provide a no-show option to the provider computing device 204 upon the expiration of the customized wait time period. For example, the no-show option enables the provider computing device 204 to indicate, with a single button click: 1) that the requestor has not arrived, 2) that the transportation request should be canceled, and 3) that the provider computing device 204 should be released to be matched to a new transportation request.

In at least one embodiment, the wait time optimization system 106 can provide additional information with the no-show option. For example, based on the extracted features discussed above, the wait time optimization system 106 can provide information such as an expected time of arrival associated with the requestor computing device 206. To illustrate, as shown in FIG. 2, the requestor computing device 206 may be taking an unexpectedly long time to reach the pickup location 202, thereby not arriving at the pickup location 202 prior to the customized wait time period expiring. Despite this, the wait time optimization system 106 can determine, based on the requestor computing device's 206 current location, speed, direction of travel, historical pickup information associated with venue, and historical pickup information associated with the pickup location that the requestor computing device 206 will likely arrive at the pickup location 202 within the next 30 seconds. Thus, in addition to providing the no-show option to the provider computing device 204 at the expiration of the customized wait time period, wait time optimization system 106 can provide an additional notification that the requestor is only 30 seconds away if the provider would care to wait.

In one or more embodiments, the provider associated with the provider computing device 204 is a human provider. In additional embodiments, the provider computing device 204 may be part of an autonomous driving system that operates a vehicle without human input. In that embodiment, the wait time optimization system 106 can provide the same features and functionality described with regard to FIG. 2. For example, the wait time optimization system 106 can include settings that enable an autonomous system to always select a no-show option when presented, or vice versa.

Although FIG. 2 illustrates features and functionality of the wait time optimization system 106 in connection with an airport venue, in additional embodiments, the wait time optimization system 106 can function in connection with any other type of venue. For example, the wait time optimization system 106 can provide the same features and functionality in connection with other types of large venues (e.g., stadiums, mass transit centers, museums, and other points of interest). Additionally, the wait time optimization system 106 can provide the same features and functionality in connection with standard curbside pickup locations, business locations, and private residences.

To further illustrate how features associated with the requestor computing device 206 can affect the customized wait time period associated with the provider computing device 204, in at least one embodiment, the wait time optimization system 106 takes battery life associated with the requestor computing device 206 into account when generating the customized wait time period for the provider computing device 204. For example, if the battery life associated with the requestor computing device 206 is low when the transportation request is submitted, the wait time optimization system 106 may shorten the customized wait time period for the provider computing device 204 (e.g., in response to determining that the requestor computing device 206 will likely lose power and shut off before the requestor computing device 206 arrives at the pickup location).

Figure 3:
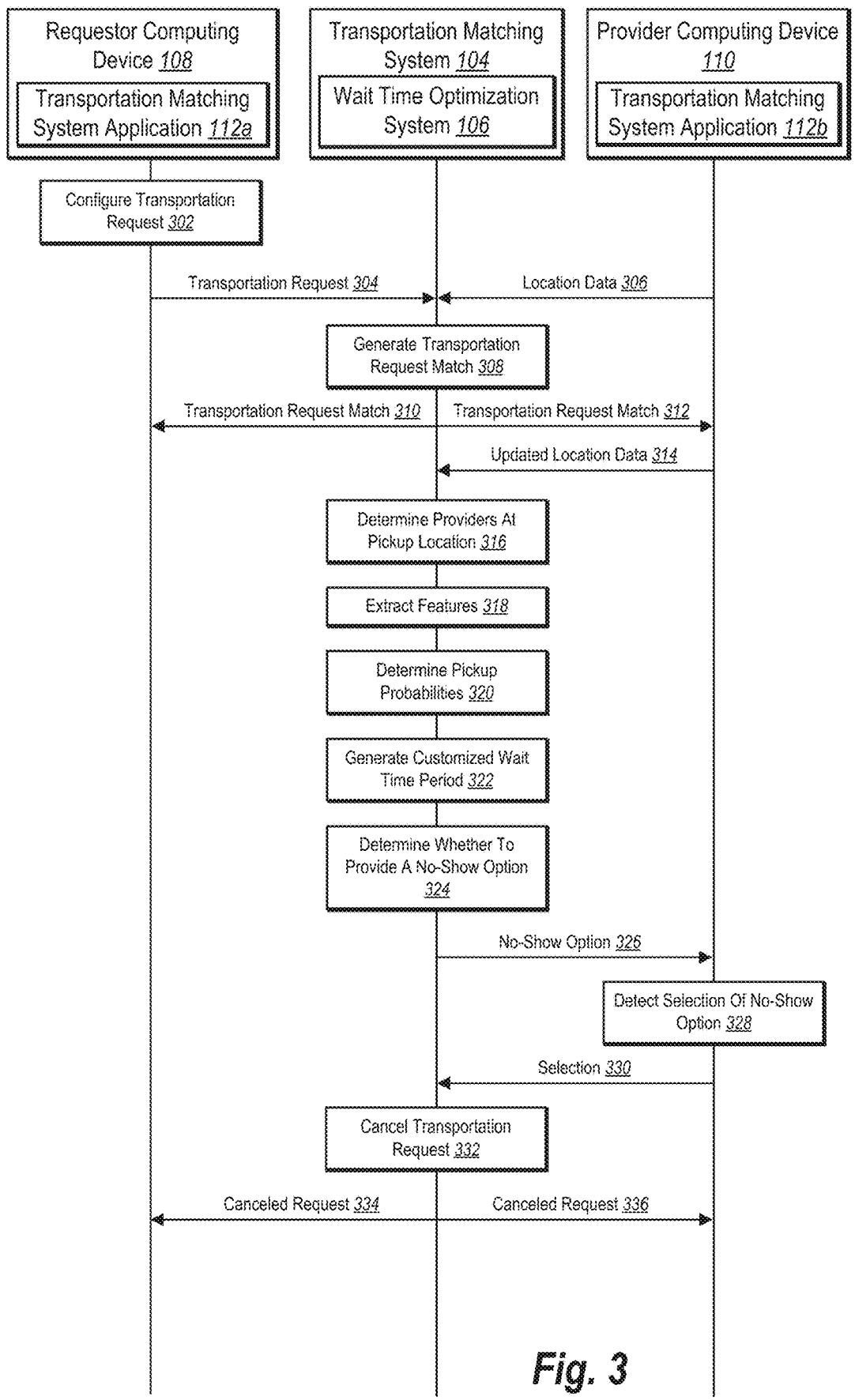
FIG. 3 illustrates a sequence diagram of generating and utilizing a customized wait time period in accordance with one or more embodiments.

FIG. 3 illustrates a sequence diagram of a series of steps undertaken by the wait time optimization system 106 in optimizing wait times for a provider computing device that has been matched to a transportation request. As shown in FIG. 3, the series of steps starts with the requestor computing device 108 configuring a transportation request (302). For example, the transportation matching system application 112a installed on the requestor computing device 108 can provide various selectable controls that enable the user of the requestor computing device 108 (e.g., the requestor) to select transportation request options. In response to receiving the options, the transportation matching system application 112a on the requestor computing device 108 can configure the transportation request (302) by formatting the selected transportation request options into a standardized transportation request. The transportation matching system application 112a on the requestor computing device 108 can then send the transportation request (304) to the transportation matching system 104.

Concurrent with, or prior to, the transportation matching system application 112a configuring the transportation request (302), the provider computing device 110 may be located elsewhere and/or in transit. Accordingly, the transportation matching system application 112b can periodically and regularly send location data (306) associated with the provider computing device 110 to the transportation matching system 104.

In response to receiving the transportation request (304) from the requestor computing device 108 and the location data (306) from the provider computing device 110, the transportation matching system 104 can generate a transportation request match (308). For example, in one or more embodiments, the transportation matching system 104 generates a transportation match (308) based on multiple considerations including, but not limited to, the provider computing device's 110 distance from a pickup location specified in the transportation request, ratings associated with the user of the requestor computing device 108 and the user of the provider computing device 110, a drop off location specified by the transportation request, transportation matching system preferences associated with the user of the requestor computing device 108 and the user of the provider computing device 110, and current traffic, time of day, and weather conditions. In response to these considerations, the transportation matching system 104 can generate the transportation request match (308) that specifies that the provider computing device 110 and the requestor computing device 108 should both commence moving to the pickup location specified in the transportation request in order to initiate transportation.

The transportation matching system 104 can provide information related to the transportation request match (310) (312) to the requestor computing device 108 and the provider computing device 110, respectively. For example, in one or more embodiments, the transportation matching system 104 can provide information related to the transportation request match (310) to the requestor computing device 108 including, but not limited to, a provider name associated with the provider computing device 110, a current location associated with the provider computing device 110, an estimated time of arrival associated with the provider computing device 110, and a cost estimate associated with the transportation request. In one or more embodiments, the transportation matching system 104 can provide information related to the transportation request match (312) to the provider computing device 110 including, but not limited to, a requestor name associated with the requestor computing device 108, a pickup location associated with the transportation request, a rating associated with the requestor computing device 108, and a payment estimate associated with the transportation request.

In response to receiving information related to the transportation request match (312), the transportation matching system application 112b can provide updated location data (314) to the wait time optimization system 106. For example, the transportation matching system application 112b can provide information at regular time intervals (e.g., every 20 seconds), and/or regular distance intervals (e.g., every 50 yards) as the provider computing device 110 approaches the pickup location specified in the transportation request match. Additionally or alternatively, the transportation matching system application 112b can provide updated location data (314) to the wait time optimization system 106 in response to detecting a user selection of a display option indicating that the provider computing device 110 has arrived at the pickup location.

In response to receiving updated location data (314) from the transportation matching system application 112b, the wait time optimization system 106 can determine that the provider is at the pickup location (316). For example, the wait time optimization system 106 can determine that the updated location data matches the specified pickup location by comparing GPS information, WiFi information, or the like. Additionally or alternatively, the wait time optimization system 106 can determine that the updated location data matches the specified pickup location in response to receiving the indication of a user selection of a display option (e.g., an "Arrived" button on a transportation matching system application GUI).

After determining that the provider computing device 110 has arrived at the pickup location specified by the transportation request, the wait time optimization system 106 can extract features (318) for use in generating a customized wait time period for the transportation request relative to the provider computing device 110. In one or more embodiments, various factors are indicative of how long it will take a requestor computing device to arrive at a pickup location and if the requestor computing device will arrive at all. For example, the wait time optimization system 106 can extract features (318) including, but not limited to, whether the transportation matching system application 112a is currently open and active on the requestor computing device 108, whether the requestor computing device 108 is currently moving, how much battery power the requestor computing device 108 has left, a distance between the requestor computing device 108 and the provider computing device 110, a current location of the requestor computing device 108, a current location of the provider computing device 110, a speed and direction of travel associated with the requestor computing device 108, a speed and direction of travel associated with the provider computing device 110, a transportation matching system user history associated with the requestor computing device 108, a transportation matching system user history associated with the provider computing device 110, a transportation matching system history associated with the pickup location specified by the transportation request and/or transportation request match, current weather conditions, the current time of day and day of the week, historical transportation request information associated with a nearby building or location of interest, information associated with a nearby event (e.g., a sporting game, concert, parade, etc.), an associated mode of transportation, and/or whether the transportation request is associated with a shared versus an un-shared ride. In one or more embodiments, the wait time optimization system 106 can extract these and other features from one or more of: the transportation request, the transportation matching system application 112a associated with the requestor computing device 108, the transportation matching system application 112b associated with the provider computing device 110, and the transportation matching system 104.

Next, the wait time optimization system 106 can determine one or more pickup probabilities (320). For example, based on features associated with a transportation request, the wait time optimization system 106 can determine a pickup probability of a standard wait time period, one or more other wait time periods, and/or incremental time periods (e.g., by inputting corresponding feature vectors into a pickup probability model). Furthermore, the wait time optimization system 106 can dynamically update the pickup probabilities in real time based on changes in the features associated with the transportation request. The wait time optimization system 106 can utilize the calculated pickup probabilities to determine whether to use a standard wait time period or to customize the wait time period (e.g., to correspond to a target pickup probability). For example, if the wait time optimization system 106 determines that a standard wait time (e.g., 600 seconds) for a given matched transportation request is associated with a pickup probability that exceeds a target pickup probability (e.g., 90% or 95%), the wait time optimization system 106 can utilize the standard wait time period for the given matched transportation request. However, if the pickup probability fails to meet the target pickup probability, the wait time optimization system 106 may customize the wait time period. In some embodiments, the wait time optimization system 106 customizes the wait time period (e.g., by lengthening or shortening the wait time period) in order to achieve the target pickup probability. In other embodiments, the wait time optimization system 106 customizes the wait time period (e.g., shortens the wait time period or cancels the wait time period) if achieving the target pickup probability is not feasible or results in an efficient use of system and/or provider resources, thereby allowing a provider to move on to another transportation request sooner.

It should be noted that the type of transportation request (e.g., shared or un-shared) can affect pickup probabilities associated with the transportation request. For example, the standard wait time period associated with the transportation request may be different if the transportation request specifies a shared ride (e.g., a ride where the provider picks up a series of requestors who share transportation for at least a portion of their ride). Thus, incremental wait time periods and customized wait time periods may also be different for shared rides.

In some embodiments, the wait time optimization system 106 utilizes incremental time periods and corresponding incremental pickup probabilities to customize wait time periods. For example, if the wait time optimization system 106 determines a pickup probability for a standard wait time period fails to meet a target pickup probability, the wait time optimization system 106 can utilize an incremental probability corresponding to an incremental time period to determine a customized wait time period. For example, the wait time optimization system 106 can determine an incremental probability that the pickup associated with the transportation request will occur within an incremental wait time period beyond a standard wait time period (e.g., within an additional 30 seconds beyond a standard 300 seconds). Accordingly, the wait time optimization system 106 can determine whether adding the incremental time period to the standard wait time period will result in a pickup probability that meets a target pickup probability, and can customize the wait time period accordingly. In some embodiments, the wait time optimization system 106 utilizes the incremental probability for the incremental time period to determine a value associated with a provider continuing to wait for the incremental time period to pick up a requestor, and can compare the value to a cost associated with the provider continuing to wait to pick up the requestor. In one or more embodiments, the incremental wait time period is customized based on the pickup location, nearby demand, value of the transportation request (e.g., a more valuable transportation request may merit a longer incremental wait time period), and/or a requestor rating (e.g., a requestor with a higher rating may earn a longer incremental wait time period.

In one or more embodiments, and as will be discussed in greater detail below with regard to FIG. 5, the wait time optimization system 106 can determine pickup probabilities (e.g., the probability that the pickup will occur within the standard pickup wait time period and the incremental probability that the pickup will occur within the incremental wait time period) utilizing a trained machine learning model. For example, to determine the probability that the pickup will occur within the standard pickup wait time period, the transportation matching system 104 can generate an input vector for a trained pickup probability neural network based on the extracted features and the standard pickup wait time period. In response to providing the generated input vector to the trained pickup probability neural network, the transportation matching system 104 can receive a probability that the pickup will occur within the standard pickup wait time period. Similarly, to determine the incremental probability that the pickup will occur within the incremental wait time period, the transportation matching system 104 can generate an input vector for a trained pickup probability neural network based on the extracted features and the incremental wait time period. In response to providing the generated input vector to the trained pickup probability neural network, the transportation matching system 104 can receive a probability that the pickup will occur within the incremental wait time period. Furthermore, to determine a pickup probability for a customized wait time period, the transportation matching system 104 can generate an input vector based on the extracted features and the customized wait time period. In response to providing the generated input vector to the trained pickup probability neural network, the transportation matching system 104 can receive a probability that the pickup will occur within the customized wait time period. As mentioned previously, the transportation matching system 104 can dynamically determine updated probabilities for wait time periods in real time by generating corresponding updated input vectors based on and utilizing the updated input vectors (and the pickup probability neural network) to obtain updated probabilities.

With the pickup probabilities determined, the wait time optimization system 106 can generate a customized wait time period (322). For example, in at least one embodiment, the wait time optimization system 106 generates the customized wait time period by optimizing system operations based on the determined pickup probabilities. To illustrate, in at least one embodiment, and as will be discussed in greater detail below with regard to FIG. 7, the wait time optimization system 106 optimizes system operations based on the difference between the determined probabilities multiplied by a value that represents an increase in system efficiency associated with the transportation request. The wait time optimization system 106 can further optimize system operations based on efficiency losses associated with the transportation request.

If the result of optimizing system operations is within target or threshold probability range, the wait time optimization system 106 can generate the customized wait time period (322) based on the standard pickup wait time and the incremental wait time period. For example, if the standard pickup wait time is 300 seconds and the incremental wait time period is 30 seconds, the wait time optimization system 106 may generate a customized wait time period that includes 315 seconds for the provider computing device 110.

It follows that the wait time optimization system 106 can determine whether to provide a no-show option (324) based on a comparison between the amount of time the provider computing device 110 has been at the pickup location and the customized wait time period. For example, if the provider computing device 110 has been at the pickup location for 320 seconds and the customized wait time period is 330 seconds, the wait time optimization system 106 may continue monitoring the progress of the requestor computing device 108. If the provider computing device 110 has been at the pickup location for 330 seconds and the customized wait time period is 330 seconds, the wait time optimization system 106 can provide the no-show option (326) to the provider computing device 110 via the transportation matching system application 112b. Additionally or alternatively, in at least one embodiment, the wait time optimization system 106 can determine the customized wait time prior to the provider computing device 110 arriving at the pickup location. In that embodiment, the wait time optimization system 106 begins the customized wait time period upon arrival of the provider computing device 110 at the pickup location, and determines whether to provide the no-show option (324) based on the expiration of the customized wait time period.

In one or more embodiments, the transportation matching system application 112b may display the no-show option as a notification or other type of user interface. Alternatively, the transportation matching system application 112b may enable a previously disabled no-show button. Regardless of how the no-show option is provided, the transportation matching system application 112b can detect a selection of the no-show option (328) by a user of the provider computing device 110. For example, as discussed above, by selecting the no-show option, the provider is effectively indicating to the transportation matching system 104 that they are no longer willing to wait for the requestor to arrive at the pickup location and that they would like to be released back into the pool of available providers waiting to be matched to another transportation request. The transportation matching system application 112b can then communicate the detected selection (330) back to the transportation matching system 104.

In response to receiving the indication of the selection made via the transportation matching system application 112b, the transportation matching system 104 can cancel the transportation request (332). As discussed above, the transportation matching system 104 can cancel the transportation request by removing the transportation request from the pool of currently active transportation requests, and by releasing the provider computing device 110 back into the pool of providers who are currently awaiting a transportation request match. The transportation matching system 104 can communicate this canceled request (334) (336) to the requestor computing device 108, and to the provider computing device 110, respectively.

Figure 4A:
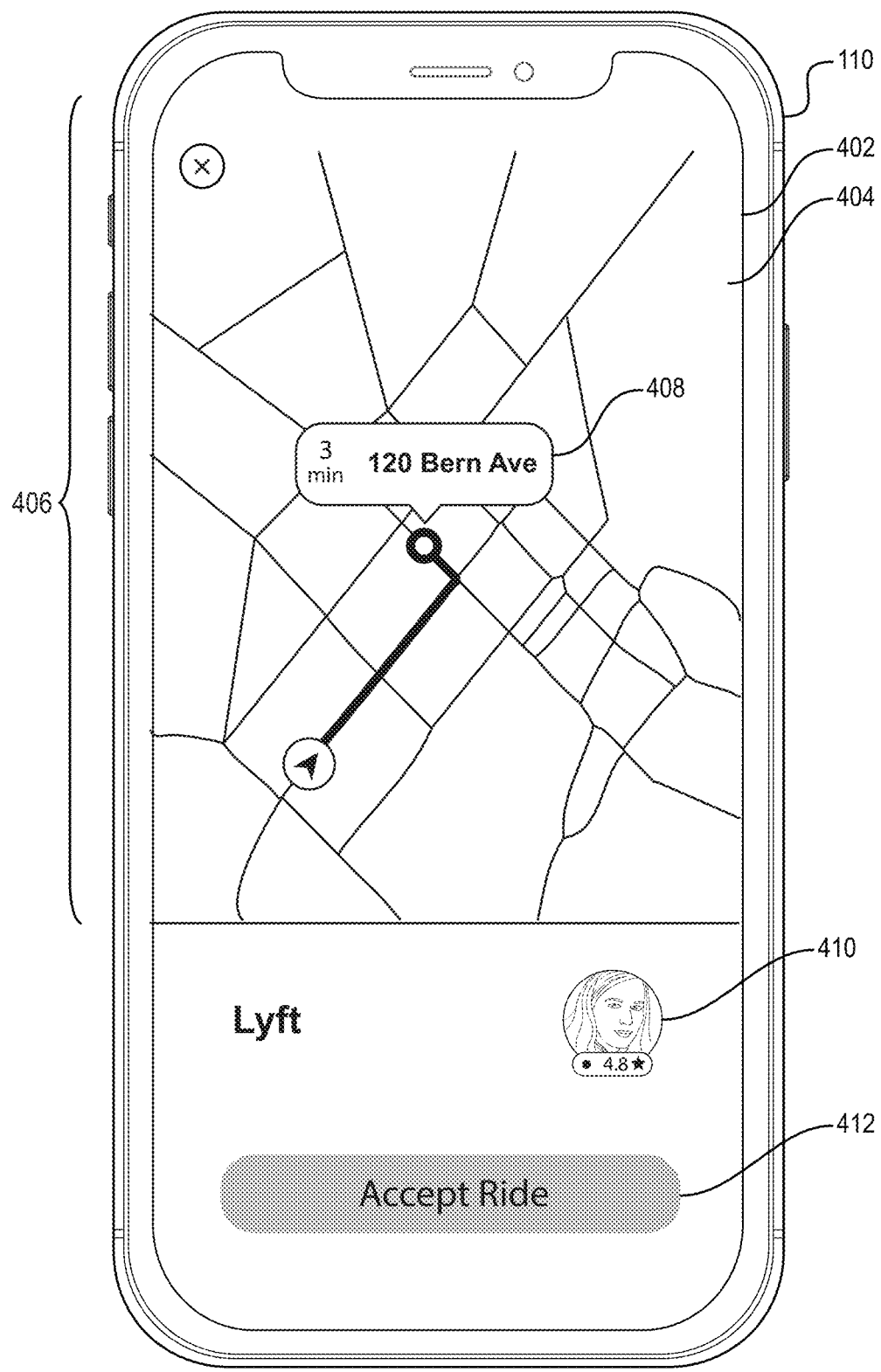
FIGS. 4A-4E illustrate a series of graphical user interfaces in accordance with one or more embodiments.

As mentioned above, the transportation matching system 104 and the wait time optimization system 106 (e.g., via the transportation matching system application 112b installed on the provider computing device 110) provide one or more graphical user interfaces including display components that enable users to engage with features of the transportation matching system 104 and the wait time optimization system 106. FIGS. 4A-4D illustrate a series of graphical user interfaces (GUIs) by which the transportation matching system 104 and the wait time optimization system 106 provide various display components and other features to one or more provider computing devices. For example, as shown in FIG. 4A, the transportation matching system 104 provides the transportation provider GUI 404 on a touch screen display 402 of the provider computing device 110. As mentioned above, the transportation matching system 104 and the wait time optimization system 106 provide one or more GUIs and display components via the transportation matching system application 112b installed on the provider computing device 110.

For example, as shown in FIG. 4A, in response to generating a transportation request match, the transportation matching system 104 can provide the transportation provider GUI 404 including a real-time map 406 showing a pickup location indicator 408 associated with the transportation request match, as well as the current distance between the provider computing device 110 and the specified pickup location. In at least one embodiment, the transportation matching system 104 orients the real-time map 406 around the current location of the provider computing device 110 (e.g., indicated by the arrow indicator within the real-time map 406).

As shown in FIG. 4A, the transportation provider GUI 404 can further include a matched requestor element 410. In one or more embodiments, the matched requestor element 410 can include a profile picture associated with the matched requestor (e.g., the user of the requestor computing device 108), and a rating associated with the matched requestor. In at least one embodiment, the transportation matching system 104 provides the matched requestor element 410 in an effort to help the user of the provider computing device 110 identify the requestor associated with the transportation request match at the pickup location.

To that end, the transportation provider GUI 404 further includes the accept ride button 412 as part of the transportation provider GUI 404. In one or more embodiments, the transportation matching system 104 confirms the transportation match between the provider computing device 110 and the requestor computing device 108 with regard to the transportation match in response to a detected selection of the accept ride button 412.

Figure 4B:
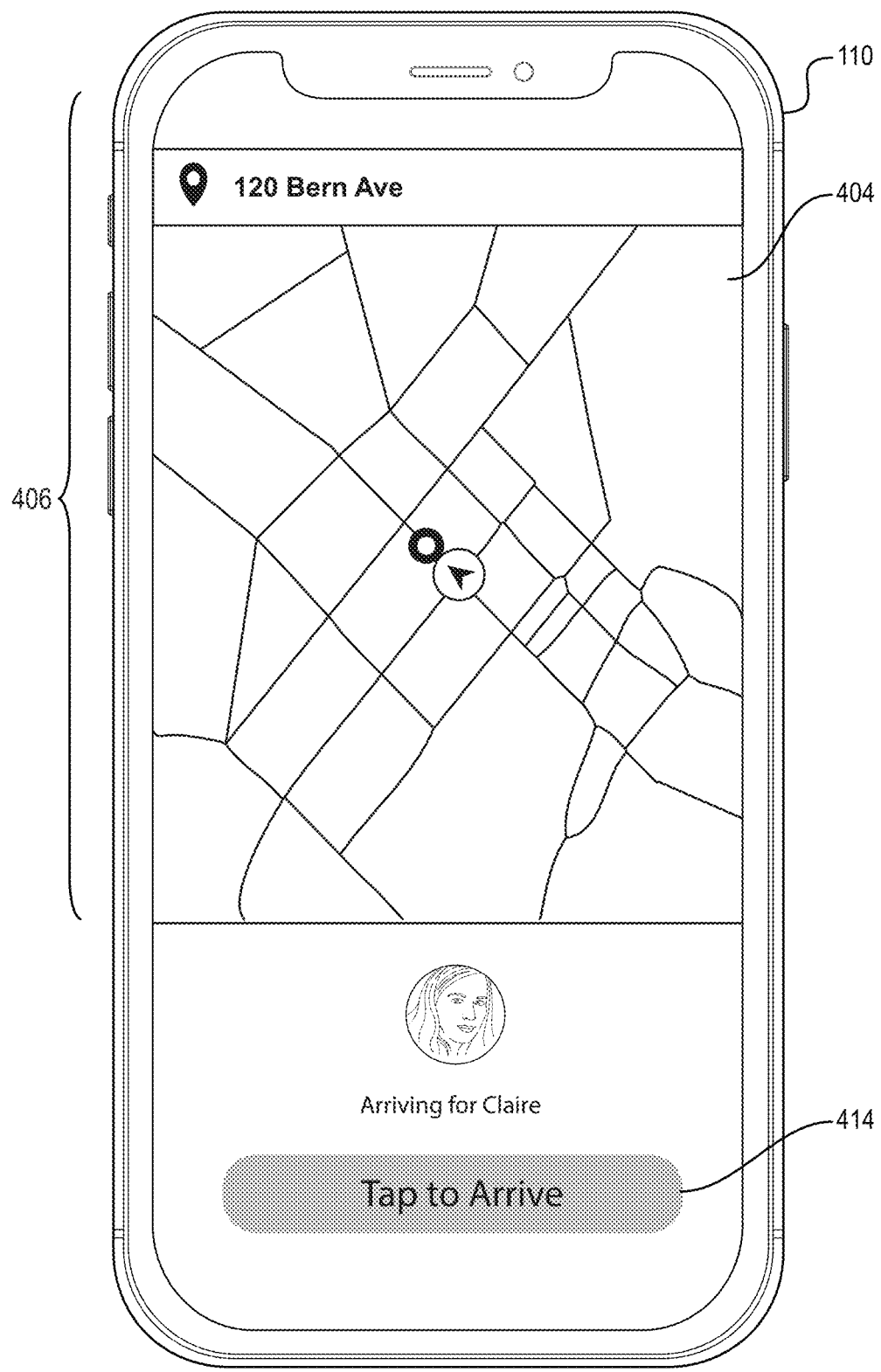

After confirming the transportation match, the transportation matching system 104 can track the travel progress of the provider computing device 110 toward the specified pickup location. For example, as shown in FIG. 4B, the transportation matching system 104, in connection with the transportation matching system application 112b, can update the real-time map 406 to show the location of the provider computing device 110 relative to the specified pickup location. As discussed above, the transportation matching system 104 can determine the location of the provider computing device 110 by receiving updated location information (e.g., GPS coordinates, WiFi information, etc.) from the provider computing device 110.

In one or more embodiments, the transportation matching system 104 can provide a selectable arrived button 414 in the transportation provider GUI 404. For example, in one embodiment, the transportation matching system 104 can enable the arrived button 414 when the provider computing device 110 is within a threshold distance from the specified pickup location. In alternative embodiments, the transportation matching system 104 can enable the arrived button 414 in response to detecting that the provider computing device 110 has stopped at the specified pickup location.

Figure 4C:
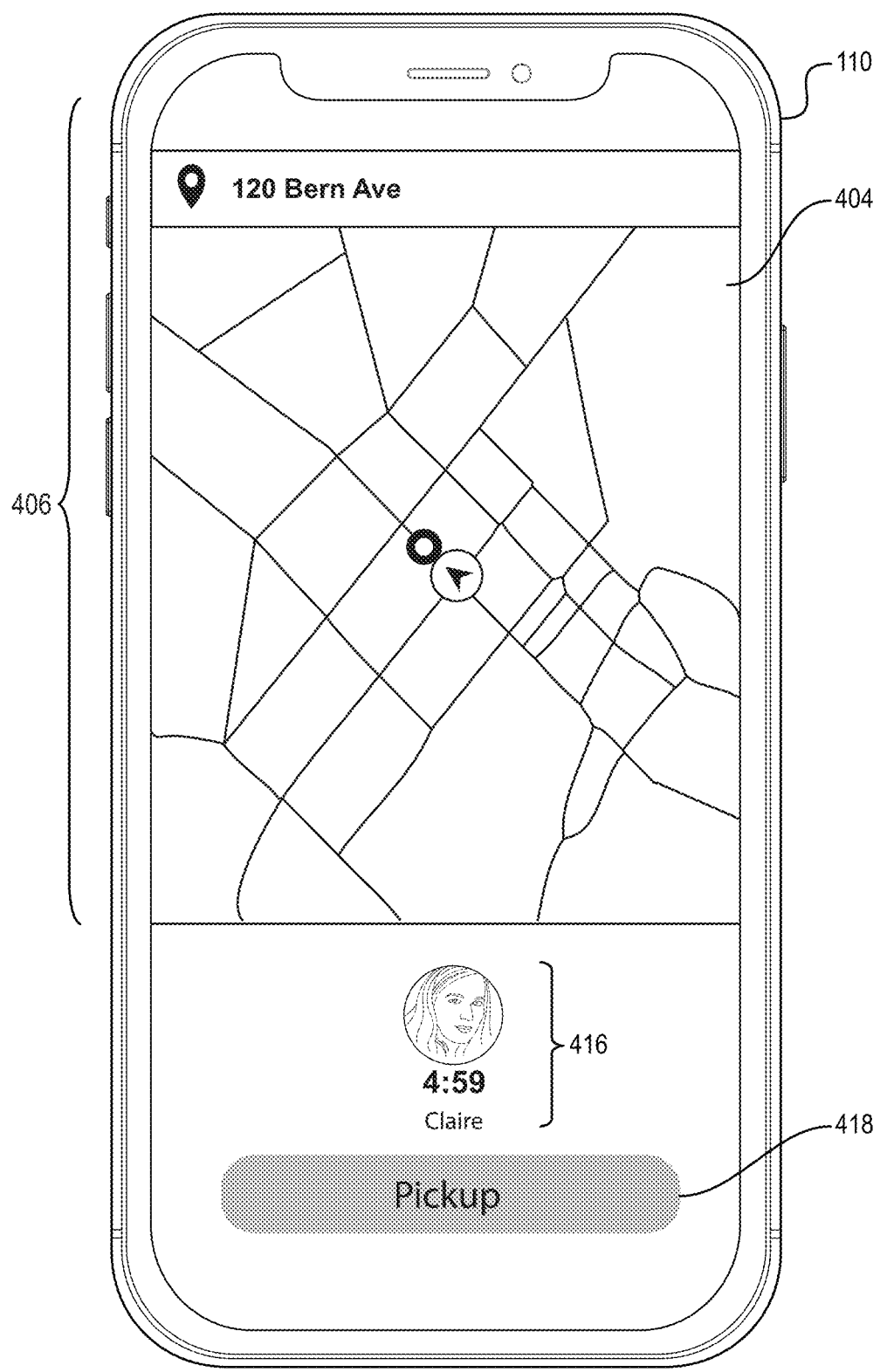

In response to detecting a selection of the arrived button 414, the wait time optimization system 106 can generate a customized wait time period for the provider computing device 110, as discussed above with reference to FIG. 3. For example, as shown in FIG. 4C, the wait time optimization system 106 can provide the wait time indicator 416 within the transportation provider GUI 404. In one or more embodiments, the wait time indicator 416 counts down the customized wait time period to zero in order to indicate to the provider how much longer they will have to wait before the wait time optimization system 106 will provide a no-show option. In additional or alternative embodiments, the wait time indicator 416 can be any visual representation of time elapsing (e.g., a shrinking icon, moving clock hands).

Figure 4D:
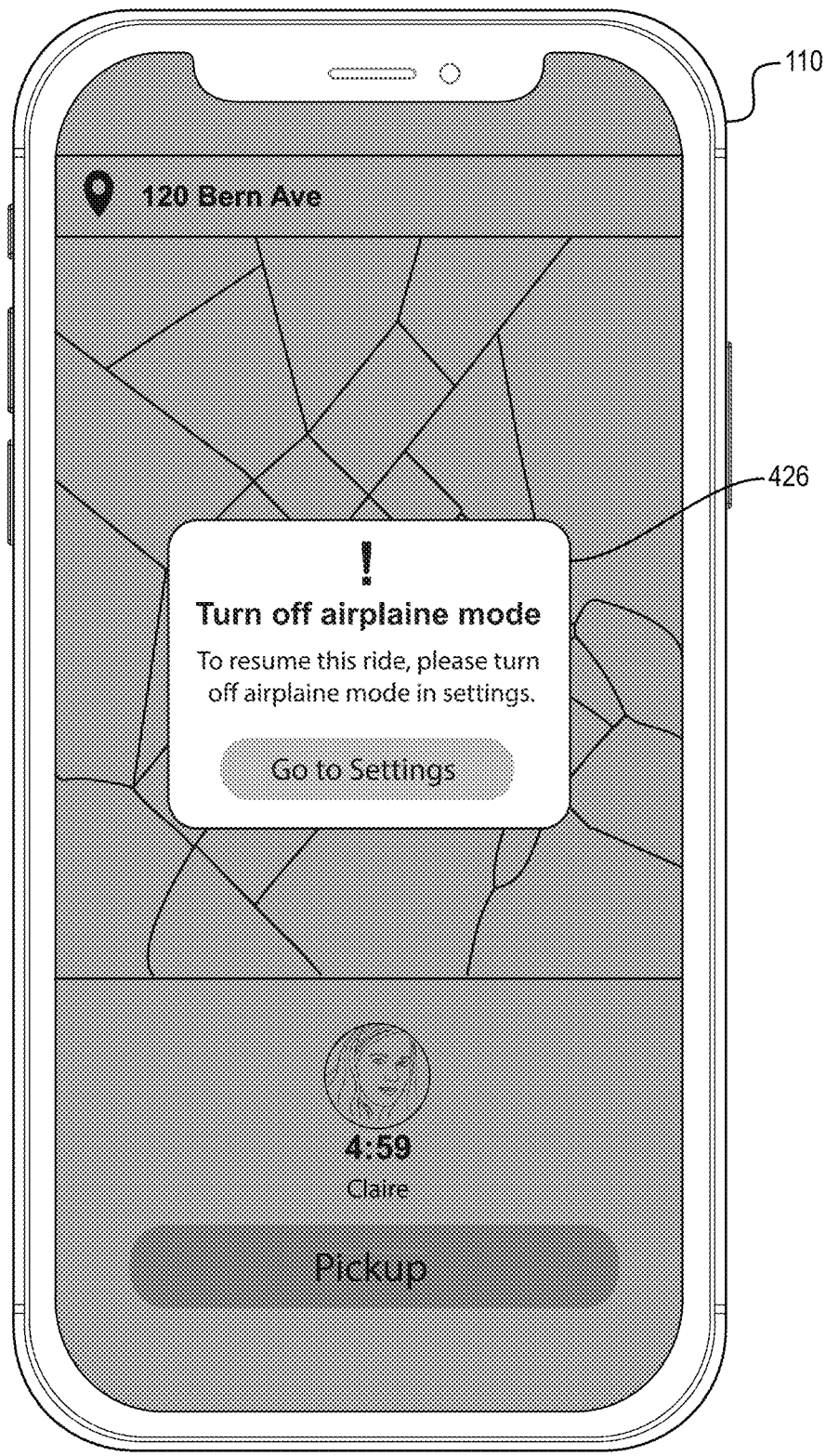

In one or more embodiments, the wait time optimization system 106 can pause the wait time indicator 416 for various reasons. For example, as shown in FIG. 4D, the wait time optimization system 106 can pause the wait time indicator 416 and disable the transportation provider GUI 404 in response to detecting that the provider computing device 110 has activated "airplane mode" (e.g., thereby disabling the network connection of the provider computing device 110). In at least one embodiment, the wait time optimization system 106 can keep the wait time associated with and displayed by wait time indicator 416 paused and the transportation provider GUI 404 disabled until the provider computing device 110 deactivates "airplane mode." In alternative embodiments, the wait time optimization system 106 can pause the wait time indicator 416 without disabling the rest of the transportation provider GUI 404.

The wait time optimization system 106 can similarly pause the wait time indicator and disable the transportation provider GUI 404 in response to detecting that the provider computing device 110 has lost its network connection, has disabled its location services, or has moved a threshold distance away from the pickup location. For example, in one or more embodiments, a provider computing device 110 may leave a threshold geographic area surrounding a pickup location indicated by a transportation request after arriving (e.g., and thus causing the wait time optimization system 106 to enable the pickup option associated with the transportation request and to begin counting down the customized wait time period associated with the provider computing device 110). In at least one embodiment, it may be indicative of fraudulent activity and subsequent system inefficiencies when the wait time optimization system determines that the provider computing device has activated airplane mode, lost its network connection, disabled its location services, or moved away from the pickup location. Accordingly, by pausing the wait time indicator (and the associated wait time), the wait time optimization system 106 can help ensure that potential fraudulent activity will not affect system operations. Additionally, by un-pausing the wait time indicator once the provider computing device 110 regains its network connection and/or moves back to within a threshold distance of the pickup location, the wait time optimization system 106 accounts for typical (and non-fraudulent) network connectivity issues, traffic problems, and parking difficulties.

Figure 4E:
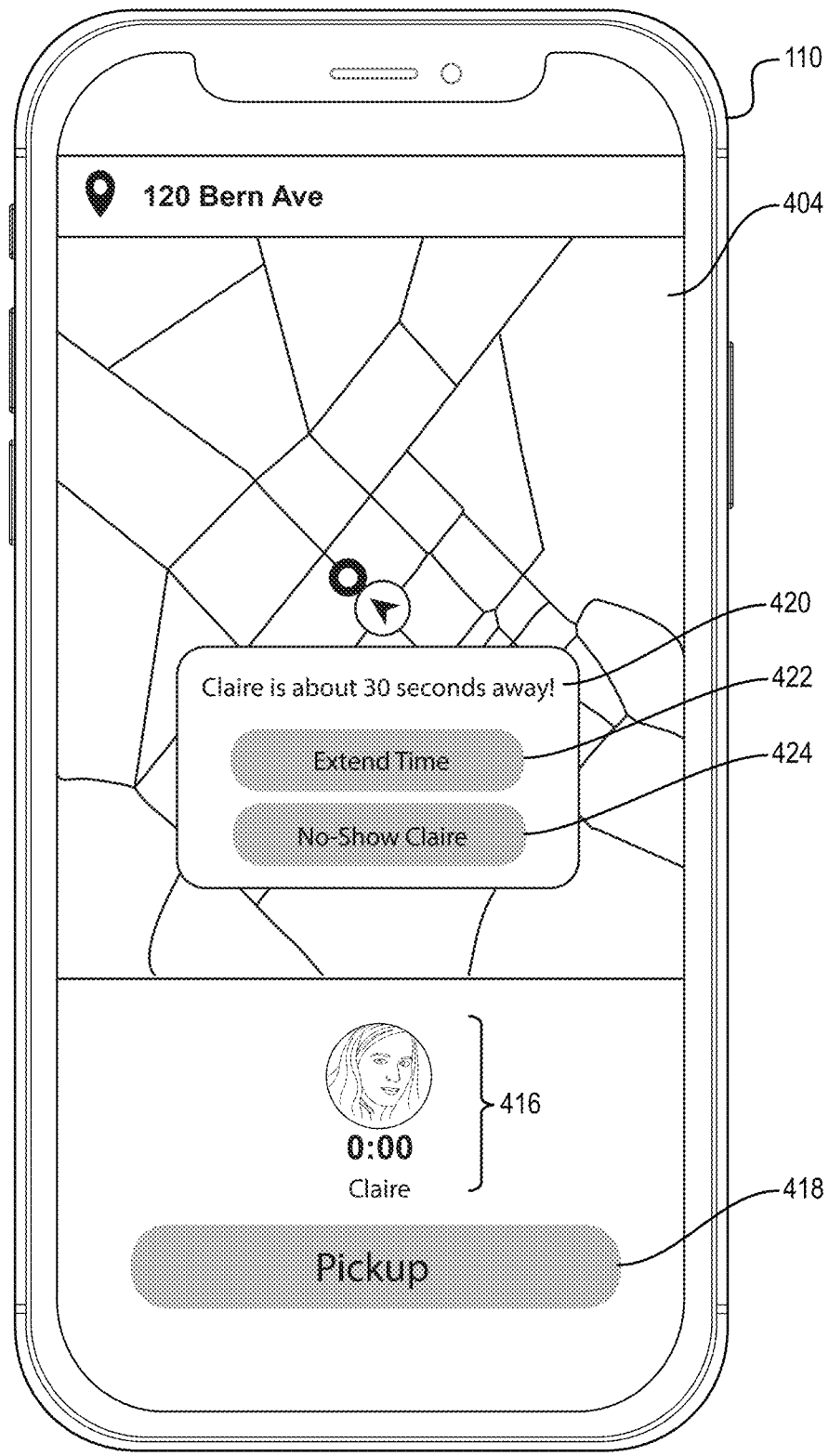

Upon the expiration of the customized wait time period, the wait time optimization system 106 can provide a no-show option to the provider computing device 110. For example, as shown in FIG. 4E, the wait time optimization system 106 can provide the no-show option 424 overlaid on the transportation provider GUI 404 in response to determining that the requestor computing device 108 (e.g., associated with "Claire") has not arrived at the pickup location within the customized wait time period. In response to a detected selection of the no-show option 424, the wait time optimization system 106 can cancel the transportation request match between the provider computing device 110 and the requestor computing device 108.

In one or more embodiments, the wait time optimization system 106 can provide additional options upon the expiration of the customized wait time period. For example, as shown in FIG. 4E, the wait time optimization system 106 can provide additional information associated with the requestor computing device 108 as well as the extend time button 422. In one or more embodiments, the wait time optimization system 106 provides the extend time button 422 in response to determining that the requestor computing device 108 will arrive at the pickup location within a threshold or target probability range. For example, the wait time optimization system 106 can provide the extend time button 422 in response to determining that the requestor computing device 108 is moving with a speed and direction that make it 94% likely (e.g., which is within a 90%-95% target probability range) that that the requestor computing device 108 will arrive at the pickup location within 30 seconds. In response to a detected selection of the extend time button 422, the wait time optimization system 106 can extend the customized wait time period by a predetermined amount of time.

Alternatively, in at least one embodiment, the wait time optimization system 106 can provide an option for the user of the provider computing device 110 to input any wait time period desired. For example, the user of the provider computing device 110 and the user of the requestor computing device 108 may have held ex parte communications (e.g., may have text messaged) after the transportation match was made but before the requestor computing device 108 arrives at the pickup location. Based on these communications, the user of the provider computing device 110 may have agreed to wait an amount of time that is outside the customized wait time period. In that case, the wait time optimization system 106 can enable the user of the provider computing device 110 to input any amount of time that the wait time optimization system 106 can use as the customized wait time period.

Figure 5:
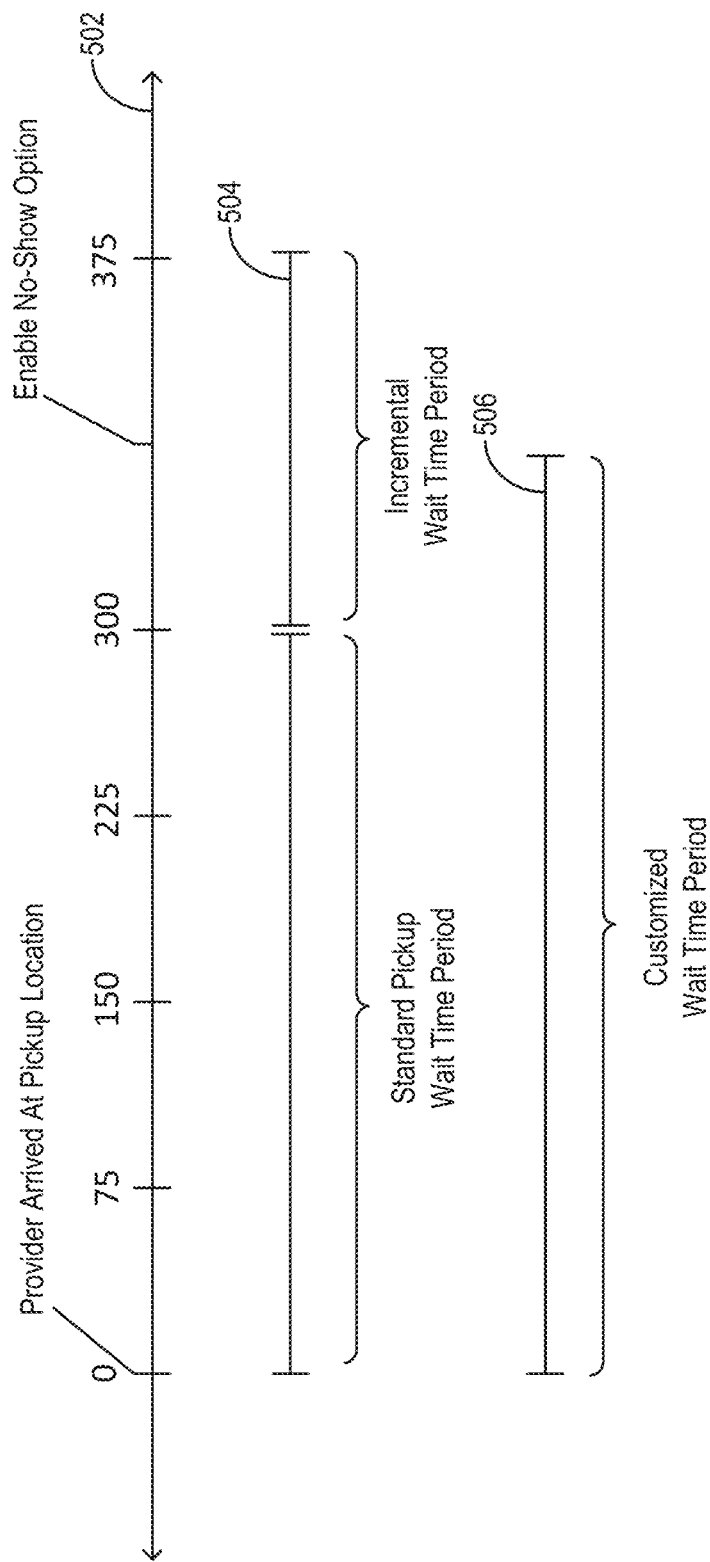
FIG. 5 illustrates a timeline diagram in accordance with one or more embodiments.

FIG. 5 illustrates an example timeline with additional details related to how the wait time optimization system 106 generates a customized wait time period for a provider computing device. For example, the wait time optimization system 106 can detect that a provider computing device arrives at a pickup location. Thus, as shown by the timeline 502 in FIG. 5, the wait time optimization system 106 can assign a zero seconds timestamp to that detected arrival, and can begin the process of generating a customized wait time period for the provider computing device.

As discussed above, the wait time optimization system 106 generates the customized wait time period for the provider computing device based on a standard pickup wait time period and an incremental wait time period, as indicated by the wait time period indicator 504. As shown in FIG. 5, the standard wait time period may be 300 seconds, while the incremental wait time period is an additional 75 seconds beyond the standard wait time period.

In one or more embodiments, the wait time optimization system 106 first determines pickup probabilities associated with each wait time period. In at least one embodiment, as will be discussed in greater detail below with regard to FIGS. 6A and 6B, the wait time optimization system 106 can utilize a trained pickup probability neural network to determine pickup probabilities associated with each wait time period. For example, the wait time optimization system 106 can extract and provide features associated with the transportation request, the requestor computing device and the provider computing device associated with the transportation request, and the pickup location to the pickup probability neural network, along with the wait time period (e.g., 300 seconds or 375 seconds). In response to receiving this information, the pickup probability neural network can provide a probability of pickup for that wait time period. To illustrate, the pickup probability neural network may return an 87% pickup probability for the standard pickup wait time period of 300 seconds, and a 99% pickup probability for the customized wait time period of 375 seconds.

In at least one embodiment, the wait time optimization system 106 utilizes these determined pickup probabilities to optimize a metric representing a value associated with the provider continuing to wait that is based on: a pickup probability for the incremental wait time period; a pickup probability for the standard pickup wait time period; a value associated with the transportation request (e.g., may include a booking cost, or other profit); and a cost function that determines a cost associated with the transportation request (e.g., may include provider pay, an opportunity cost, an inconvenience cost, etc.). For example, the optimized metric may be equal to the incremental wait time period pickup probability minus the standard wait time period pickup probability, multiplied by value associated with the transportation request. The optimized metric may be further equal to that total value, subtracted by the cost associated with the transportation request. In one or more embodiments, the wait time optimization system 106 may utilize machine learning to determine any of these listed functions and/or values (e.g., in addition to the pickup probabilities as discussed above).

The wait time optimization system 106 can continually optimize this metric above until the metric exceeds a corresponding cost (e.g., the cost of the provider continuing to wait—an actual and/or opportunity cost to the provider and/or the wait time optimization system 106 resulting from the provider waiting an additional amount of time beyond a standard wait time period). For example, the wait time optimization system 106 can continue to optimize the equation until the metric is more than a predetermined threshold cost. To illustrate, the wait time optimization system 106 can determine the metric above at zero seconds (e.g., immediately upon the provider arriving at the pickup location) to determine whether the metric exceeds the corresponding cost of the provider being there. As the provider has just arrived, it is most likely that the metric will not exceed this cost. The wait time optimization system 106 can again determine the metric at 150 seconds (e.g., thereby changing the standard pickup wait time period to 150 seconds and the incremental wait time period to 225 seconds) to determine that the metric is still less than the cost of the provider continuing to wait. The wait time optimization system 106 can again determine the metric at 300 seconds (e.g., thereby changing the standard pickup wait time period to 0 seconds and the incremental wait time period to 75 seconds) to determine that the metric is still less than the associated cost, but by a narrower margin. The optimization system 106 can again determine the metric at 337 seconds (e.g., thereby changing the incremental wait time period to 38 seconds) to determine that the metric now exceeds the cost of associated with the provider continuing to wait at the pickup location.

At that point, the wait time optimization system 106 can end the customized wait time period indicated by time indicator 506 in FIG. 5. In one or more embodiments, the end of the customized wait time period is the point in time at which the requestor is no longer likely to arrive at the pickup location in enough time for the transportation request to be valuable. Accordingly, as further shown in FIG. 5, the wait time optimization system 106 can enable a no-show option on the provider computing device upon ending the customized wait time period.

Figure 6A:
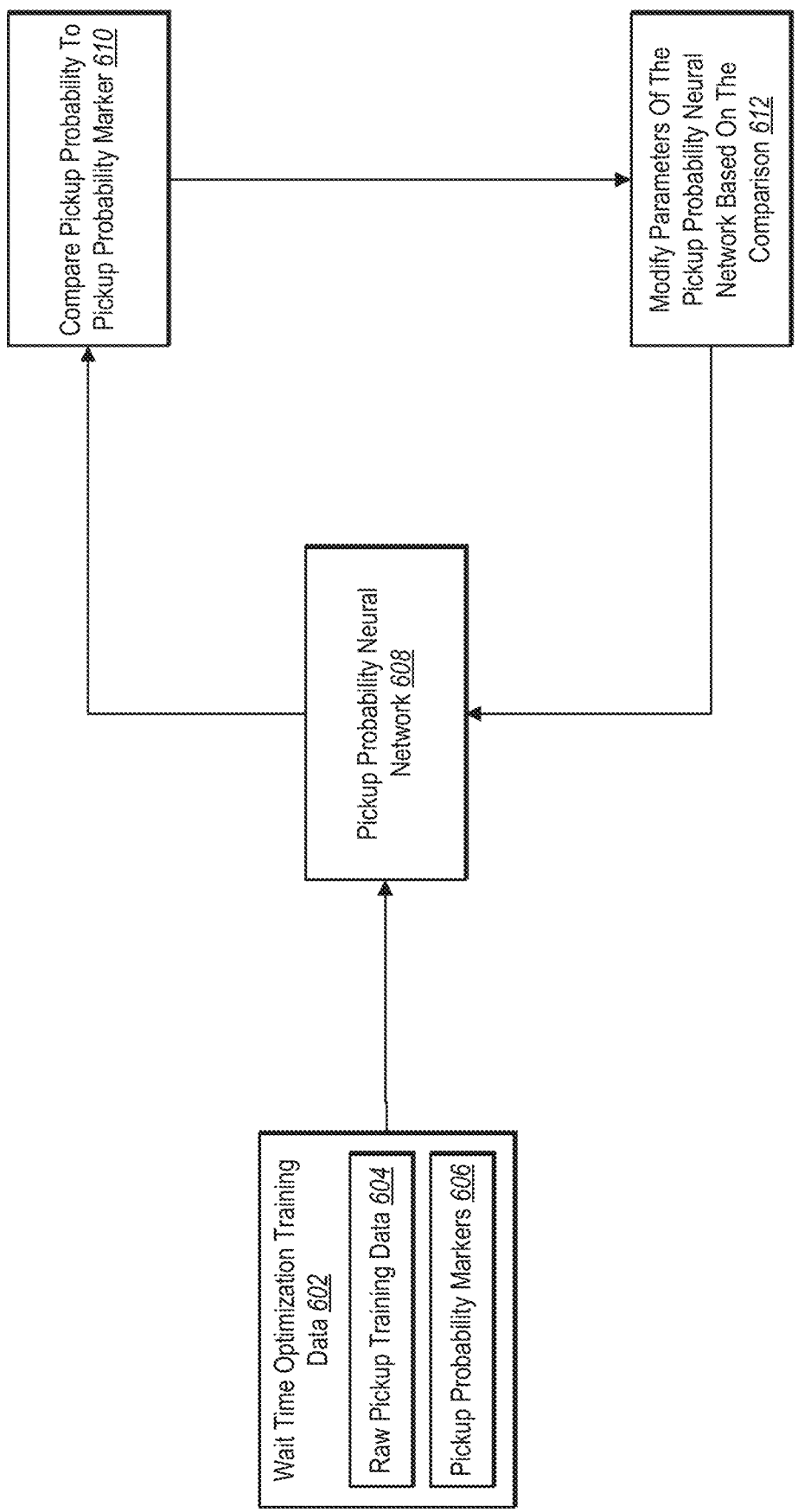
FIGS. 6A-6B illustrate a series of diagrams associated with a pickup probability neural network in accordance with one or more embodiments.

As discussed above, the wait time optimization system 106 can train a pickup probability neural network to generate pickup probabilities associated with a standard pickup wait time period and/or an incremental wait time period. For instance, FIG. 6A illustrates training a pickup probability neural network 608 in accordance with one or more embodiments. Specifically, as shown in FIG. 6A, the wait time optimization system 106 identifies the wait time optimization training data 602. For example, as mentioned above, the wait time optimization system 106 trains the pickup probability neural network 608 based on raw pickup training data 604 and pickup probability markers 606. In one or more embodiments, the wait time optimization system 106 trains the pickup probability neural network 608 by providing an instance of raw pickup training data 604 to the pickup probability neural network 608 as an input vector, comparing the output of the pickup probability neural network 608 to the pickup probability marker 606 that correspond to the instance of raw pickup training data 604, and then modifying the parameters of the pickup probability neural network 608 based on the comparison. This process will now be described in greater detail.

As shown in FIG. 6A, the wait time optimization training data 602 includes raw pickup training data 604 and pickup probability markers 606. In one or more embodiments, the raw pickup training data 604 includes instances of raw pickup data associated with previously received, matched, and completed transportation requests. For example, an instance of raw pickup training data 604 may include information associated with a previously received transportation request including, but not limited to: requestor information (e.g., rating, transportation matching system history, preferences), provider information (e.g., rating, transportation matching system history, preferences), pickup location information (e.g., average provider wait times associated with a particular pickup location), and fulfillment information (e.g., whether the transportation request was successfully completed, how long it took, how much it cost).

Each instance of raw pickup training data 604 corresponds to a pickup probability marker 606. For example, every previously received transportation request within the training data corresponds to a pickup probability marker 606 that includes a ground truth (e.g., a probability that the requestor arrived at the pickup location within a specified amount of time) associated with that received transportation request.

To begin training the pickup probability neural network 608, the wait time optimization system 106 provides an instance of raw pickup training data 604 to the pickup probability neural network 608. In one or more embodiments, the pickup probability neural network 608 may include the functionality to generate an input vector from received raw pickup training data. Accordingly, in response to receiving the instance of raw pickup training data 604, the pickup probability neural network 608 may generate an input vector and pass the generated input vector to an input layer of the pickup probability neural network 608.

Depending on the structure of the pickup probability neural network 608, the pickup probability neural network 608 may process the generated input vector in a number of ways. For example, in one embodiment, the pickup probability neural network 608 may pass latent feature vectors between sequential processing layers of the pickup probability neural network 608. Additionally, the pickup probability neural network 608 may pool prediction results (e.g., in a max pooling layer), and generate a pickup probability.

After the pickup probability neural network 608 generates a pickup probability, the wait time optimization system 106 continues to train the pickup probability neural network 608 by performing the act 610 of comparing the pickup probability to a corresponding pickup probability marker. For example, as discussed above, for each instance of raw pickup training data 604, the wait time optimization training data 602 includes a corresponding pickup probably marker 606. Each pickup probability marker 606 includes a ground truth indicating a pickup probability corresponding to a received transportation request.

As such, the act 610 can involve the wait time optimization system 106 determining whether the pickup probability generated by the pickup probability neural network 608 is the same as the pickup probability marker 606 corresponding to the raw pickup training data 604 provided to the pickup probability neural network 608. The wait time optimization system 106 can determine that the generated pickup probability is the same as the corresponding marker by utilizing a direct character comparison (e.g., via OCR). In additional embodiments, the wait time optimization system 106 can determine that the generated probability is the same as the corresponding marker if the generated probability is "close enough." For example, if the generated probability and the corresponding marker both are within a threshold amount of each other, the wait time optimization system 106 can determine that the probability and the marker are the same.

To continue training the pickup probability neural network 608, the wait time optimization system 106 performs the act 612 of modifying parameters of the pickup probability neural network 608 based on the comparison performed in the act 610. For example, based on this comparison, the wait time optimization system 106 can modify parameters of one or more layers of the pickup probability neural network 608 to reduce the measure of loss.

In one or more embodiments, the wait time optimization system 106 continues training the pickup probability neural network 608 until either the wait time optimization training data 602 is exhausted or the measure of loss is minimized and stable over a threshold number of training cycles. The wait time optimization system 106 may periodically retrain the pickup probability neural network 608 in the same manner illustrated in FIG. 6A. Once training of the pickup probability neural network 608 is complete, the wait time optimization system 106 can apply the pickup probability neural network 608 to unknown raw information (e.g., raw transportation requests and time intervals with no corresponding training markers).

Figure 6B:
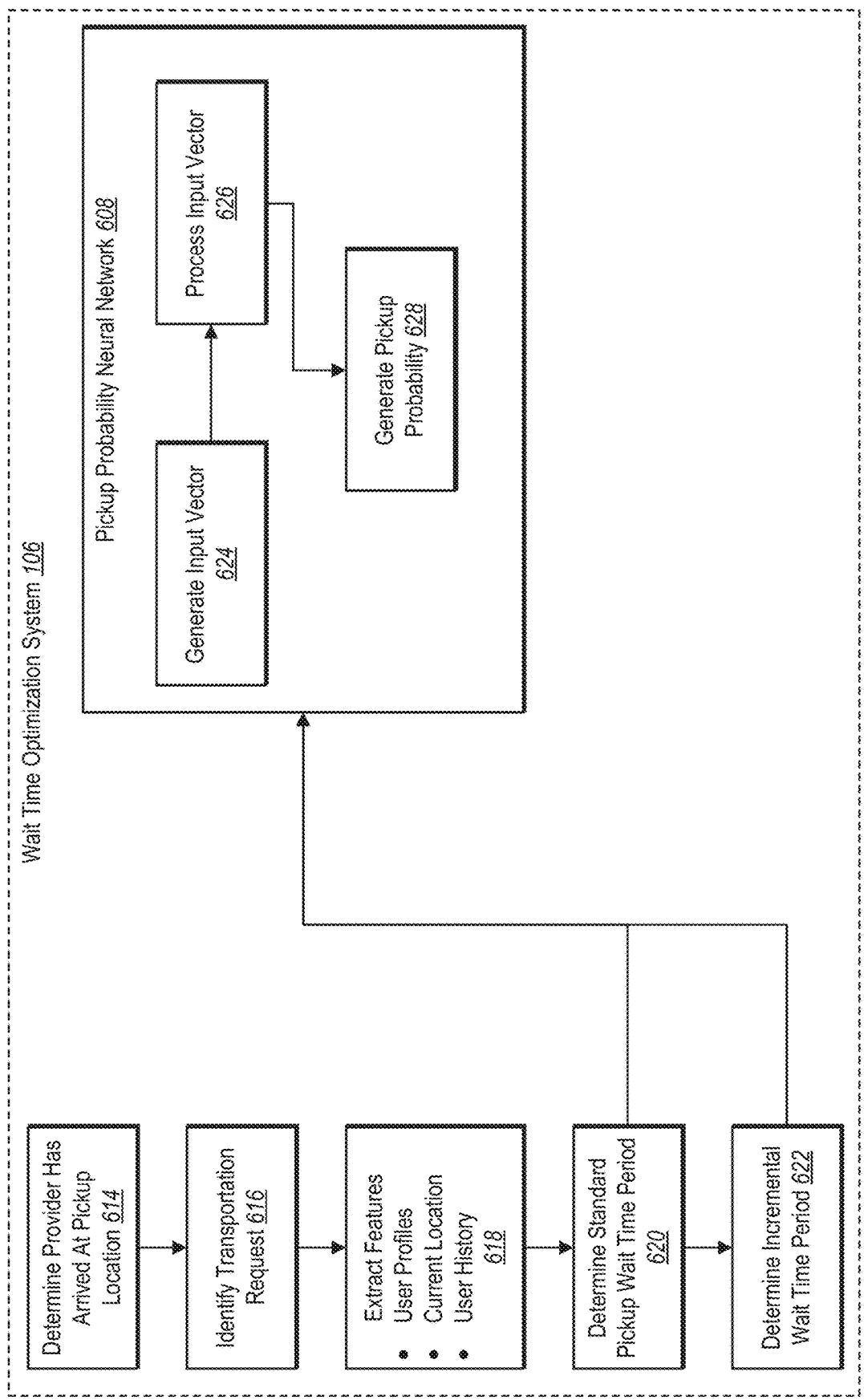

FIG. 6B illustrates additional detail with regard to how the pickup probability neural network 608 generates a pickup probability associated with a transportation request. For example, FIG. 6B shows the wait time optimization system 106 performing an act 614 of determining that a provider has arrived at a pickup location. As discussed above, the wait time optimization system 106 can determine that the provider has arrived at the pickup location in response to monitoring a GPS location associated with the provider computing device 110, or in response to a detected selection of an arrived button (e.g., the arrived button 414 shown in FIG. 4B).

Next, the wait time optimization system 106 can perform the act 616 of identifying a transportation request associated with the current transportation request match between the provider computing device 110 and the requestor computing device 108. For example, the wait time optimization system 106 can identify the relevant transportation request by querying the transportation matching system 104.

The wait time optimization system 106 can also perform the act 618 of extracting features associated with the identified transportation request. For example, as discussed above, the wait time optimization system 106 can extract features including an indication of whether an application associated with the requestor computing device is open, an indication of whether the requestor computing device is moving, an indication of remaining battery power associated with the requestor computing device, a distance between the requestor computing device and the provider computing device, a transportation matching system user history associated with the requestor computing device, a transportation matching system user history associated with the provider computing device, a transportation matching system history associated with a pickup location specified by the transportation request, a current speed and direction of travel associated with the requestor computing device, a current speed and direction of travel associated with the provider computing device, a coordinate location of a requested pickup location, a region (e.g., a geohash region) associated with a requested pickup location, a requested pickup location selection method, a local time of day of the transportation request (e.g., an hour of the day in a respective time zone), a shifted time of day (e.g., an hour of the day in the respective time zone plus 12 and divided by 24), historical walking distances associated with prior transportation requests and the pickup location 202, prior transportation requests made by the requestor computing device 206 relative to the pickup location 202 and other locations, prior transportation requests fulfilled by the provider computing device 204 relative to the pickup location 202 and other pickup locations, current weather and traffic conditions at the pickup location 202, event information associated with the pickup location 202 (e.g., a sporting event, a concert, a parade, etc.), a mode of transportation included in the transportation request, and/or whether the transportation request is for a shared versus an un-shared ride.

Next, in order to generate a custom wait time period for the provider computing device 110, the wait time optimization system 106 can perform the act 620 of determining a standard wait time period for the transportation request. For example, the wait time optimization system 106 can determine the standard wait time period by querying the transportation matching system 104. Additionally or alternatively, the wait time optimization system 106 can determine the standard wait time period based on the geographic location of the pickup location, based on a transportation matching system history associated with the requestor computing device 108, based on a transportation matching system history associated with the provider computing device 110, or based on the current date or time of day.

Additionally, the wait time optimization system 106 can perform the act 622 of determining an incremental wait time period associated with the transportation request. For example, the wait time optimization system 106 can determine the incremental wait time period by querying the transportation matching system 104. Additionally or alternatively, the wait time optimization system 106 can determine the incremental wait time period based on the geographic location of the pickup location, based on a transportation matching system history associated with the requestor computing device 108, based on a transportation matching system history associated with the provider computing device 110, or based on the current date or time of day.

After determining the standard wait time period and the incremental wait time period, or after determining each in series, the wait time optimization system 106 can utilize the pickup probability neural network 608 to generate a pickup probability associated with each time period. For example, as shown in FIG. 6B, the pickup probability neural network 608 can perform the act 624 of generating an input vector. In one or more embodiments, the pickup probability neural network 608 generates the input vector based on information provided by the wait time optimization system 106 including the extracted features and the determined time period. The pickup probability neural network 608 can further generate the input vector by encoding the received information into a fixed-length vector representation.

After generating the input vector, the pickup probability neural network 608 performs the act 626 of processing the input vector. For example, the pickup probability neural network 608 can process the input vector by providing the input vector to an input neural network layer, and causing the subsequent layer output to be provided to subsequent processing layers within the pickup probability neural network 608 (e.g., LSTM layers, BiMax pooling layers, etc.).

Next, the pickup probability neural network 608 can perform the act 628 of generating a pickup probability. As mentioned above, the one or more processing layers of the pickup probability neural network 608 ultimately output a pickup probability. In one or more embodiments, the pickup probability neural network 608 generates a pickup probability as a percentage.

Although the pickup probability neural network 608 is described in FIG. 6B as performing the acts 614-628, in additional embodiments, the pickup probability neural network 608 can be integrated into the wait time optimization system 106 such that the wait time optimization system 106 performs the acts 614-628.

Figure 7:
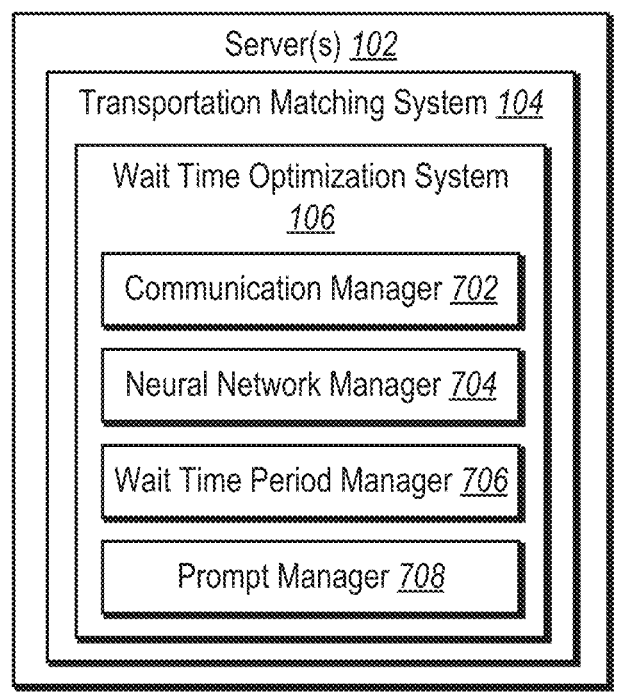
FIG. 7 illustrates a schematic diagram of the wait time optimization system in accordance with one or more embodiments.

FIG. 7 illustrates a detailed schematic diagram of an embodiment of the wait time optimization system 106 described above. Although illustrated on the server(s) 102, as mentioned above, the wait time optimization system 106 can be implemented by one or more different or additional computing devices. In one or more embodiments, the wait time optimization system 106 includes a communication manager 702, a neural network manager 704, a wait time period manager 706 and a prompt manager 708.

Each of the components 702-708 of the wait time optimization system 106 can include software, hardware, or both. For example, the components 702-708 can include one or more instructions stored on a computer-readable storage medium and executable by processors of one or more computing devices, such as a client device or server device. When executed by the one or more processors, the computer-executable instructions of the wait time optimization system 106 can cause the computing device(s) to perform the methods described herein. Alternatively, the components 702-708 can include hardware, such as a special-purpose processing device to perform a certain function or group of functions. Alternatively, the components 702-708 of the wait time optimization system 106 can include a combination of computer-executable instructions and hardware.

Furthermore, the components 702-708 of the wait time optimization system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-708 may be implemented as a stand-alone application, such as a desktop or mobile application. Furthermore, the components 702-708 may be implemented as one or more web-based applications hosted on a remote server. The components 702-708 may also be implemented in a suite of mobile device applications or "apps."

As mentioned above, and as shown in FIG. 7, the wait time optimization system 106 includes a communication manager 702. In one or more embodiments, the communication manager 702 handles communications between the wait time optimization system 106 and other computing devices. For example, the communication manager 702 can send and receive information (e.g., display information, transportation request matches, location information, user selection information) to and from the requestor computing device 108 and the provider computing device 110. To illustrate, the communication manager 702 can receive a transportation request form the requestor computing device 108 and send a transportation request match to both the requestor computing device 108 and the provider computing device 110.

As mentioned above, and as shown in FIG. 7, the wait time optimization system 106 includes a neural network manager 704. In one or more embodiments, the neural network manager 704 handles all activities related to the pickup probability neural network 608 (e.g., discussed in relation to FIGS. 6A and 6B). For example, the neural network manager 704 can train the pickup probability neural network 608 to generate pickup probabilities associated with various wait time periods. As discussed above, the neural network manager 704 can train the pickup probability neural network 608 by providing multiple training input vectors to the pickup probability neural network 608, comparing the outputs of the pickup probability neural network 608 to corresponding pickup probability markers, and modifying parameters of the pickup probability neural network 608 to minimize a measure of loss. In one or more embodiments, the neural network manager 704 utilizes or generates training input vectors based on raw pickup training data including, but not limited to, a historical transportation request, a wait time associated with the historical transportation request, and fulfillment data associated with the historical transportation request.

In one or more embodiments, the neural network manager 704 also handles the utilization of the trained pickup probability neural network 608. For example, in response to receiving information associated with a transportation request and a wait time period (e.g., a standard pickup wait time period or an incremental wait time period), the neural network manager 704 can provide this information to the trained pickup probability neural network 608 and then receive a pickup probability from the trained pickup probability neural network.

As further shown in FIG. 7, and mentioned above, the wait time optimization system 106 also includes a wait time period manager 706. In one or more embodiments, the wait time period manager 706 generates a customized wait time period associated with a transportation request. For example, as discussed above with regard to FIG. 5, the wait time period manager 706 can regularly optimize an equation that takes into account the difference between the incremental probability and the standard probability multiplied by the value of the transportation request. The wait time period manager 706 can then subtract the cost of the transportation request in order to arrive a ⊗p. If the ⊗p is still within the P90/P95 of acceptable values for ⊗p's, the wait time period manager 706 can continue to regularly optimize the equation. Once the ⊗p is not within the P90/P95 of acceptable values for ⊗p's, the wait time period manager 706 can determine that the customized wait time period for the transportation request is complete.

Furthermore, the wait time period manager 706 can pause the customized wait time period associated with the transportation request. For example, as discussed above, the wait time optimization system 106 can continually receive data from the provider computing device 110 that indicates a connectivity status. In response to determining that the connectivity status of the provider computing device 110 is offline (e.g., due to being in airplane mode, having lost its network connection, or having its location services disabled), the wait time period manager 706 can pause the customized wait time period associated with the transportation request. For example, the wait time period manager 706 can discontinue optimizing the equation discussed above until determining that the provider computing device 110 is back online. Furthermore, in response to determining that the provider computing device 110 is offline, the wait time period manager 706 can disable one or more GUIs via the transportation matching system application 112b on the provider computing device 110.

Additionally, upon determining an expiration of the customized wait time period, the wait time period manager 706 can determine an estimated time of arrival associated with the requestor computing device 108. For example, the wait time period manager 706 can determine the estimated time of arrival associated with the requestor computing device 108 based on a speed and direction of movement associated with the requestor computing device 108. If the estimated time of arrival is within a threshold amount (e.g., 60 seconds), the wait time period manager 706 can determine to provide the estimated time of arrival to the provider computing device 110.

As mentioned above, and as shown in FIG. 7, the wait time optimization system 106 includes a prompt manager 708. In one or more embodiments, the prompt manager 708 generates and provides one or more prompts that include information about the customized wait time period, an estimated time of arrival associated with the requestor computing device 108, and/or connectivity issues that have paused the customized wait time period. The prompt manager 708 can provide the generated prompts as overlays, notifications, alerts, and so forth.

Figure 8:
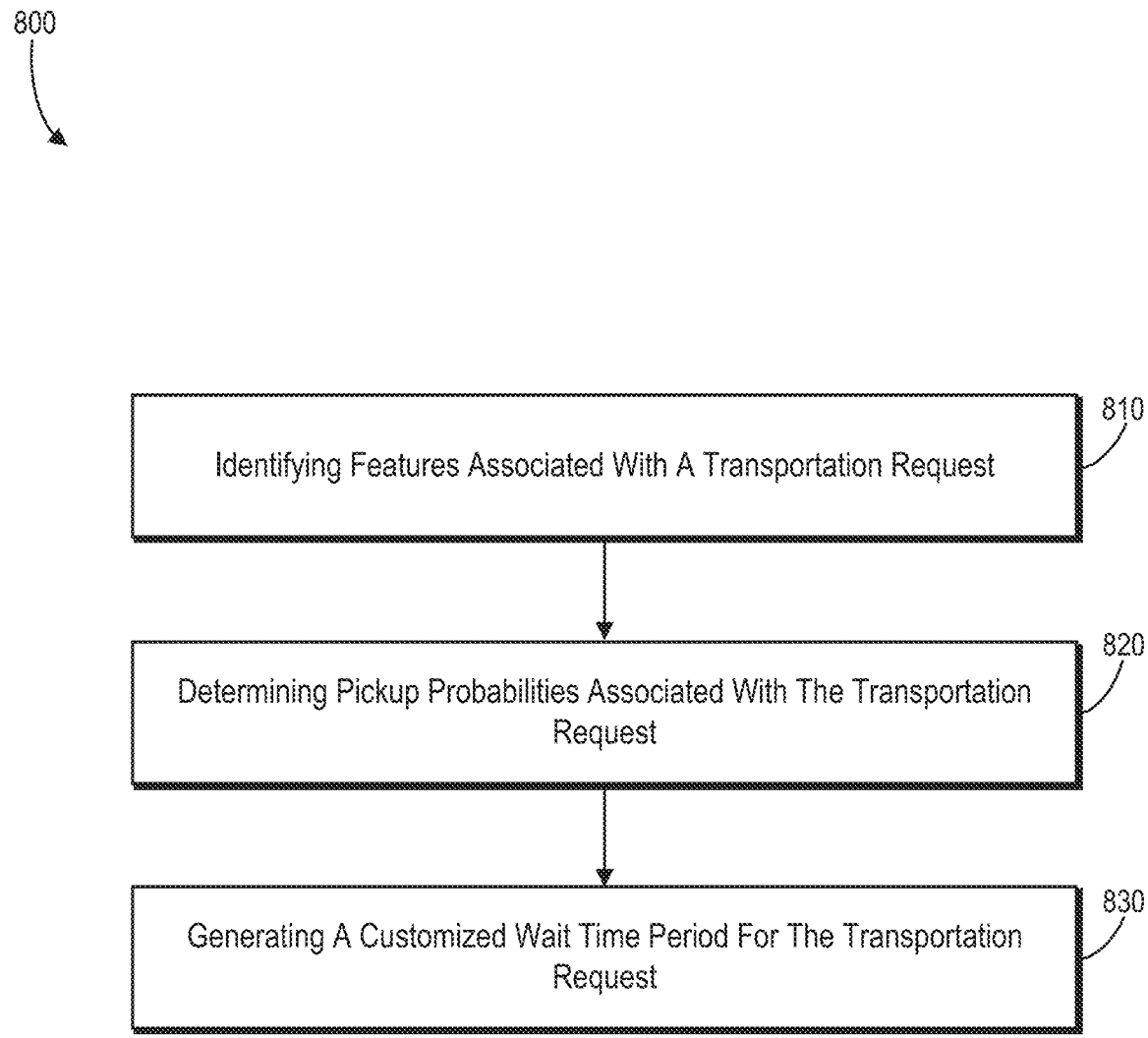
FIG. 8 illustrates a flowchart of a series of acts for generating and utilizing a customized wait time period in accordance with one or more embodiments.

FIGS. 1-7, the corresponding text, and the examples provide a number of different methods, systems, devices, and non-transitory computer-readable media of the wait time optimization system 106. In addition to the foregoing, one or more embodiments can also be described in terms of flowcharts comprising acts for accomplishing a particular result, as shown in FIG. 8. FIG. 8 may be performed with more or fewer acts. Further, the acts may be performed in differing orders. Additionally, the acts described herein may be repeated or performed in parallel with one another or parallel with different instances of the same or similar acts.

As mentioned, FIG. 8 illustrates a flowchart of a series of acts 800 for generating and utilizing a customized wait time period associated with a transportation request in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As shown in FIG. 8, the series of acts 800 includes an act 810 of identifying features associated with a transportation request. In particular, the act 810 can involve identifying, by a transportation matching system, features associated with a transportation request received from a requestor computing device. For example, identifying features associated with the transportation request can include identifying one or more of: an indication of whether an application associated with the requestor computing device is open, an indication of remaining battery power associated with the requestor computing device, an indication of whether the requestor computing device is moving, a distance between the requestor computing device and the provider computing device, a transportation matching system user history associated with the requestor computing device, a transportation matching system user history associated with the provider computing device, a transportation matching system history associated with a pickup location specified by the transportation request.

Additionally, as shown in FIG. 8, the series of acts 800 includes an act 820 of determining pickup probabilities associated with the transportation request. In particular, the act 820 can involve determining, based on the features associated with the transportation request, one or more wait time-based pickup probabilities. For example, determining one or more wait time-based pickup probabilities can include: generating an input vector based on the transportation request; and providing the input vector to a pickup probability neural network, wherein the pickup probability neural network generates the wait time-based pickup probability representing a probability that a pickup associated with the transportation request will occur within the predetermined pickup wait time period. In one or more embodiments, determining, based on the features associated with the transportation request, one or more wait time-based pickup probabilities comprises: determining a standard probability that a pickup associated with the transportation request will occur within a standard pickup wait time period, and determining an incremental probability that the pickup associated with the transportation request will occur within an incremental wait time period. Additionally, in at least one embodiment, generating the customized wait time period for the transportation request is based at least in part on the incremental probability.

In at least one embodiment, the series of acts 800 includes detecting, after generating the customized wait time period for the transportation request for the provider computing device, fraudulent activity associated with the provider computing device; and in response to the detected fraudulent activity, disabling features of a transportation matching system application on the provider computing device. For example, detecting fraudulent activity associated with the provider computing device can include detecting at least one of a loss of network connectivity associated with the provider computing device, and a current location of the provider computing device that is outside a threshold distance from the pickup location associated with the transportation request. Additionally, disabling features of a transportation matching system application on the provider computing device can include one or more of disabling a user interface associated with the transportation matching system application on the provider computing device, or disabling a wait time indicator displayed within the transportation matching system application on the provider computing device.

Furthermore, as shown in FIG. 8, the series of acts 800 includes an act 830 of generating a customized wait time period for the transportation request. In particular, the act 830 can involve generating, based at least in part on the one or more wait time-based pickup probabilities, a customized wait time period for the transportation request for a provider computing device associated with the transportation request.

Moreover, in one or more embodiments, the series of acts 800 can include an act of causing the provider computing device to selectively enable a no-show option based on the customized wait time period for the transportation request. For example, in at least one embodiment, causing the provider computing device to selectively enable a no-show option can include causing, based on the customized wait time period, the provider computing device to enable a selectable display element that when selected causes the transportation matching system to cancel the transportation request.

Figure 9:
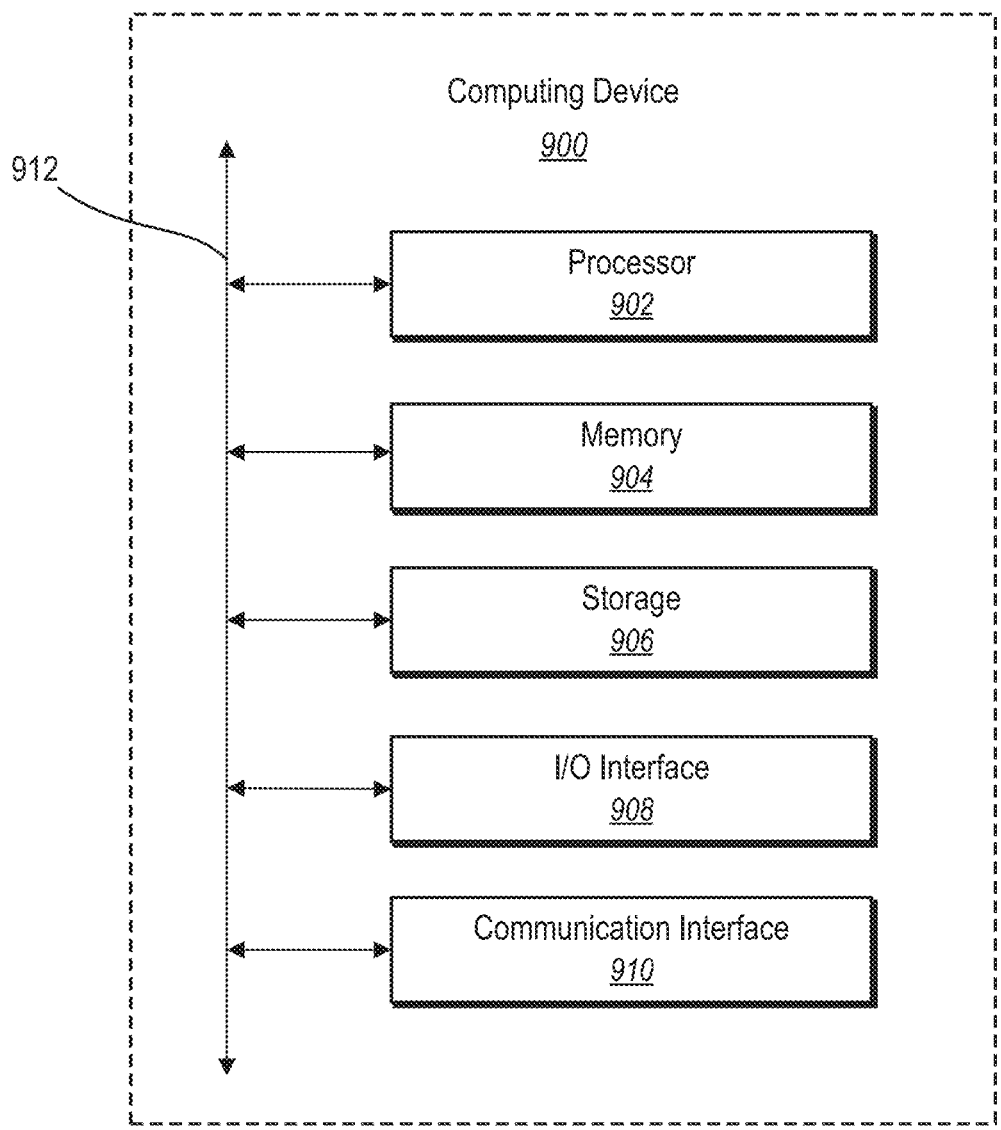
FIG. 9 illustrates a block diagram of an exemplary computing device in accordance with one or more embodiments.

FIG. 9 shows an example computing device 900, in accordance with various embodiments. In one or more embodiments, the computing device 900 may be used to implement any of the systems, devices, or methods described herein. In some embodiments, the computing device 900 may correspond to any of the various devices described herein, including, but not limited to, mobile devices, tablet computing devices, wearable devices, personal or laptop computers, vehicle-based computing devices, or other devices or systems described herein. As shown in FIG. 9, the computing device 900 can include various subsystems connected by a bus 902. The subsystems may include an I/O device subsystem 904, a display device subsystem 906, and a storage subsystem 910 including one or more computer readable storage media 908. The subsystems may also include a memory subsystem 912, a communication subsystem 920, and a processing subsystem 922.

In the computing device 900, the bus 902 facilitates communication between the various subsystems. Although a single bus 902 is shown, alternative bus configurations may also be used. The bus 902 may include any bus or other component to facilitate such communication as is known to one of ordinary skill in the art. Examples of such bus systems may include a local bus, parallel bus, serial bus, bus network, and/or multiple bus systems coordinated by a bus controller. The bus 902 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, the I/O device subsystem 904 may include various input and/or output devices or interfaces for communication with such devices. Such devices may include, without limitation, a touch screen display or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. The I/O device subsystem 904 may also include identification or authentication devices, such as fingerprint scanners, voiceprint scanners, iris scanners, or other biometric sensors or detectors. In various embodiments, the I/O device subsystem 904 may include audio output devices, such as speakers, media players, or other output devices.

The computing device 900 may include a display device subsystem 906. The display device subsystem 906 may include one or more lights, such as one or more light emitting diodes (LEDs), LED arrays, a liquid crystal display (LCD) or plasma display or other flat-screen display, a touch screen, a head-mounted display or other wearable display device, a projections device, a cathode ray tube (CRT), and any other display technology configured to visually convey information. In various embodiments, the display device subsystem 906 may include a controller and/or interface for controlling and/or communicating with an external display, such as any of the above-mentioned display technologies.

As shown in FIG. 9, the computing device 900 may include the storage subsystem 910 including various computer readable storage media 908, such as hard disk drives, solid state drives (including RAM-based and/or flash-based SSDs), or other storage devices. In one or more embodiments, the computer readable storage media 908 is configurable to store software, including programs, code, or other instructions, that is executable by a processor to provide functionality described herein. In some embodiments, the storage subsystem 910 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, the storage subsystem 910 can include a media reader, card reader, or other storage interface to communicate with one or more external and/or removable storage devices. In various embodiments, the computer readable storage media 908 can include any appropriate storage medium or combination of storage media. For example, the computer readable storage media 908 can include, but is not limited to, any one or more of random access memory (RAM), read only memory (ROM), electronically erasable programmable ROM (EEPROM), flash memory or other memory technology, optical storage (e.g., CD-ROM, DVD, Blu-ray® disk or other optical storage device), magnetic storage (e.g., tape drives, cassettes, magnetic disk storage or other magnetic storage devices). In some embodiments, the computer readable storage media 908 can include data signals or any other medium through which data can be sent and/or received.

The memory subsystem 912 can include various types of memory, including RAM, ROM, flash memory, or other memory. The memory subsystem 912 can include SRAM (static RAM) or DRAM (dynamic RAM). In some embodiments, the memory subsystem 912 can include a BIOS (basic input/output system) or other firmware configured to manage initialization of various components during for example startup. As shown in FIG. 9, the memory subsystem 912 can include applications 914 and application data 916. The applications 914 may include programs, code, or other instructions, that can be executed by a processor. The applications 914 can include various applications such as browser clients, location management applications, ride management applications, data management application, and any other application. The application data 916 can include any data produced and/or consumed by the applications 914. The memory subsystem 912 can additionally include operating system, such as macOS®, Windows®, Linux®, various UNIX® or UNIX- or Linux-based operating systems or other operating systems.

The computing device 900 can also include a communication subsystem configured to facilitate communication between the computing device 900 and various external computer systems and/or networks (such as the Internet, a LAN, a WAN, a mobile network, or any other network). The communication subsystem can include hardware and/or software to enable communication over various wired (such as Ethernet or other wired communication technology) or wireless communication channels, such as radio transceivers to facilitate communication over wireless networks, mobile or cellular voice and/or data networks, Wi-Fi networks, or other wireless communication networks. Additionally or alternatively, the communication subsystem can include hardware and/or software components to communicate with satellite-based or ground-based location services, such as GPS (global positioning system). In some embodiments, the communication subsystem may include, or interface with, various hardware or software sensors. The sensors may be configured to provide continuous and/or periodic data or data streams to a computer system through the communication subsystem.

As shown in FIG. 9, the processing subsystem can include one or more processors or other devices operable to control the computing device 900. Such processors can include the single core processors, multi-core processors, which can include central processing units (CPUs), graphical processing units (GPUs), application specific integrated circuits (ASICs), digital signal processors (DSPs) or any other generalized or specialized microprocessor or integrated circuit. Various processors within processing subsystem may be used independently or in combination depending on the application.

Figure 10:
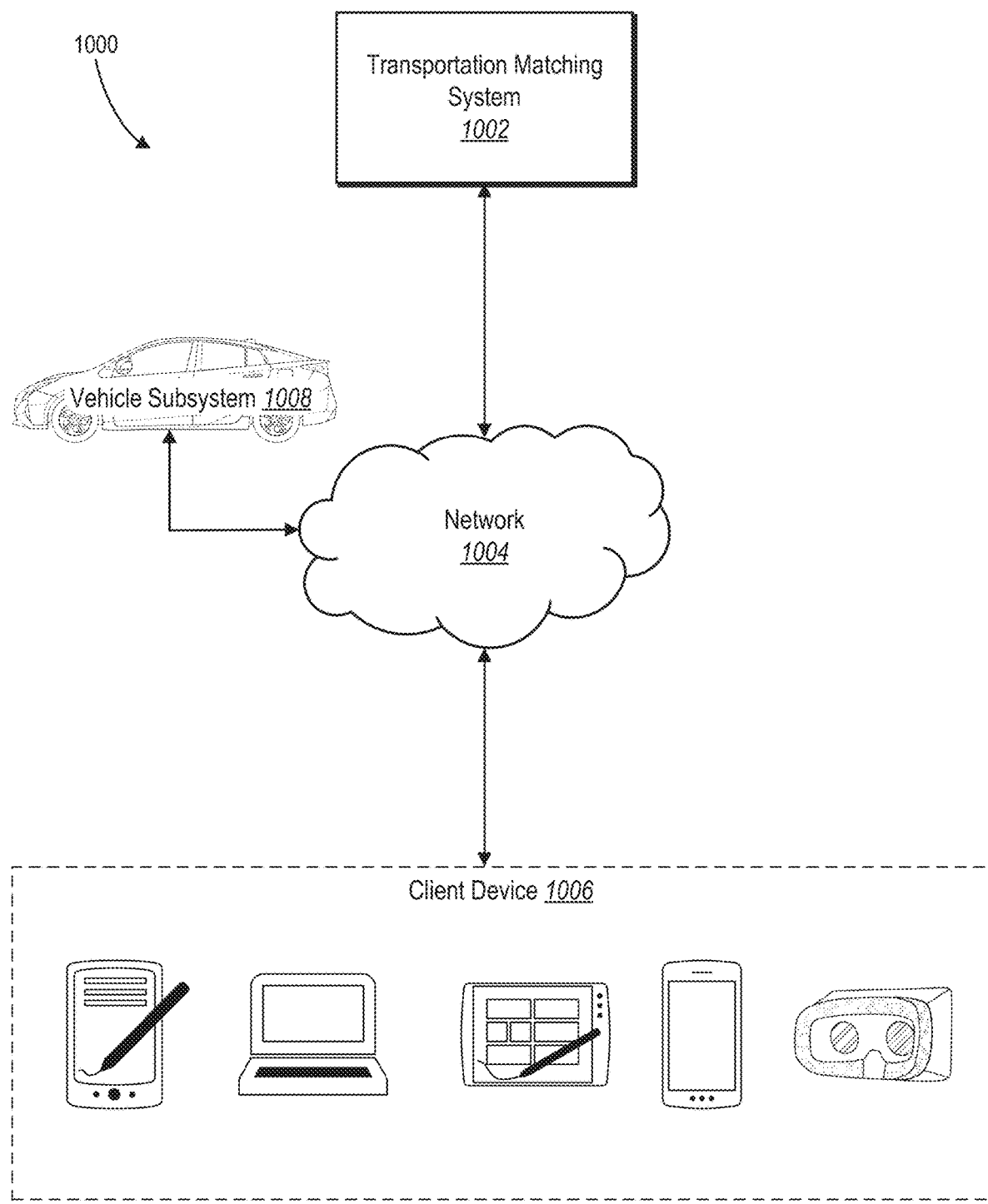
FIG. 10 illustrates an example network environment of a transportation matching system in accordance with one or more embodiments.

FIG. 10 illustrates an example network environment 1000 of a transportation matching system (e.g., the transportation matching system 104). The network environment 1000 includes a client device 1006, a transportation matching system 1002, and a vehicle subsystem 1008 connected to each other by a network 1004. Although FIG. 10 illustrates a particular arrangement of the client device 1006, the transportation matching system 1002, the vehicle subsystem 1008, and the network 1004, this disclosure contemplates any suitable arrangement of the client device 1006, the transportation matching system 1002, the vehicle subsystem 1008, and the network 1004. As an example, and not by way of limitation, two or more of the client device 1006, the transportation matching system 1002, and the vehicle subsystem 1008 communicate directly, bypassing the network 1004. As another example, two or more of the client device 1006, the transportation matching system 1002, and the vehicle subsystem 1008 may be physically or logically co-located with each other in whole or in part. Moreover, although FIG. 10 illustrates a particular number of the client devices 1006, the transportation matching systems 1002, the vehicle subsystems 1008, and the networks 1004, this disclosure contemplates any suitable number of the client devices 1006, the transportation matching systems 1002, the vehicle subsystems 1008, and the networks 1004. As an example, and not by way of limitation, the network environment 1000 may include multiple client devices 1006, the transportation matching systems 1002, the vehicle subsystems 1008, and the networks 1004.

This disclosure contemplates any suitable network 1004. As an example, and not by way of limitation, one or more portions of the network 1004 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 1004 may include one or more networks 1004.

Links may connect the client device 1006, the transportation matching system 1002, and the vehicle subsystem 1008 to the communication network 1004 or to each other. This disclosure contemplates any suitable links. In particular embodiments, one or more links include one or more wireline (such as for example Digital Subscriber Line (DSL) or Data Over Cable Service Interface Specification (DOCSIS), wireless (such as for example Wi-Fi or Worldwide Interoperability for Microwave Access (WiMAX), or optical (such as for example Synchronous Optical Network (SONET) or Synchronous Digital Hierarchy (SDH) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 1000. One or more first links may differ in one or more respects from one or more second links.

In particular embodiments, the client device 1006 may be an electronic device including hardware, software, or embedded logic components or a combination of two or more such components and capable of carrying out the appropriate functionalities implemented or supported by the client device 1006. As an example, and not by way of limitation, a client device 1006 may include any of the computing devices discussed above in relation to FIG. 8. A client device 1006 may enable a network user at the client device 1006 to access a network. A client device 1006 may enable its user to communicate with other users at other client systems or devices.

In particular embodiments, the client device 1006 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1006 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client device 1006 one or more Hyper Text Markup Language (HTML) files responsive to the HTTP request. The client device 1006 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the transportation matching system 1002 may be a network-addressable computing system that can host a ride share transportation network. The transportation matching system 1002 may generate, store, receive, and send data, such as, for example, user-profile data, concept-profile data, text data, ride request data, GPS location data, provider data, requester data, vehicle data, or other suitable data related to the ride share transportation network. This may include authenticating the identity of providers and/or vehicles who are authorized to provide ride services through the transportation matching system 1002. In addition, the transportation service system may manage identities of service requestors such as users/requesters. In particular, the transportation service system may maintain requester data such as driving/riding histories, personal data, or other user data in addition to navigation and/or traffic management services or other location services (e.g., GPS services).

In particular embodiments, the transportation matching system 1002 may manage ride matching services to connect a user/requester with a vehicle and/or provider. By managing the ride matching services, the transportation matching system 1002 can manage the distribution and allocation of vehicle subsystem resources and user resources such as GPS location and availability indicators, as described herein.

The transportation matching system 1002 may be accessed by the other components of the network environment 1000 either directly or via network 1004. In particular embodiments, the transportation matching system 1002 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 1002 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1006, or a transportation matching system 1002 to manage, retrieve, modify, add, or delete, the information stored in data store.

In particular embodiments, the transportation matching system 1002 may provide users with the ability to take actions on various types of items or objects, supported by the transportation matching system 1002. As an example, and not by way of limitation, the items and objects may include ride share networks to which users of the transportation matching system 1002 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 1002 or by an external system of a third-party system, which is separate from the transportation matching system 1002 and coupled to the transportation matching system 1002 via a network 1004.

In particular embodiments, the transportation matching system 1002 may be capable of linking a variety of entities. As an example, and not by way of limitation, the transportation matching system 1002 may enable users to interact with each other or other entities, or to allow users to interact with these entities through an application programming interfaces (API) or other communication channels.

In particular embodiments, the transportation matching system 1002 may include a variety of servers, sub-systems, programs, modules, logs, and data stores. In particular embodiments, the transportation matching system 1002 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The transportation matching system 1002 may also include suitable components such as network interfaces, security mechanisms, load balancers, failover servers, management-and-network-operations consoles, other suitable components, or any suitable combination thereof. In particular embodiments, the transportation matching system 1002 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between the transportation matching system 1002 and one or more client devices 1006. An action logger may be used to receive communications from a web server about a user's actions on or off the transportation matching system 1002. In conjunction with the action log, a third-party-content-object log may be maintained of user exposures to third-party-content objects. A notification controller may provide information regarding content objects to a client device 1006. Information may be pushed to a client device 1006 as notifications, or information may be pulled from the client device 1006 responsive to a request received from the client device 1006. Authorization servers may be used to enforce one or more privacy settings of the users of the transportation matching system 1002. A privacy setting of a user determines how particular information associated with a user can be shared. The authorization server may allow users to opt in to or opt out of having their actions logged by the transportation matching system 1002 or shared with other systems, such as, for example, by setting appropriate privacy settings. Third-party-content-object stores may be used to store content objects received from third parties. Location stores may be used for storing location information received from the client devices 1006 associated with users.

In addition, the vehicle subsystem 1008 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1008 can include an autonomous vehicle—i.e., a vehicle that does not require a human operator. In these embodiments, the vehicle subsystem 1008 can perform maneuvers, communicate, and otherwise function without the aid of a human provider, in accordance with available technology.

In particular embodiments, the vehicle subsystem 1008 may include one or more sensors incorporated therein or associated thereto. For example, sensor(s) can be mounted on the top of the vehicle subsystem 1008 or else can be located within the interior of the vehicle subsystem 1008. In certain embodiments, the sensor(s) can be located in multiple areas at once—i.e., split up throughout the vehicle subsystem 1008 so that different components of the sensor(s) can be placed in different locations in accordance with optimal operation of the sensor(s). In these embodiments, the sensor(s) can include a LIDAR sensor and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop off a requester.

In particular embodiments, the vehicle subsystem 1008 may include a communication device capable of communicating with the client device 1006 and/or the transportation matching system 1002. For example, the vehicle subsystem 1008 can include an on-board computing device communicatively linked to the network 1004 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A method comprising:
   identifying, by a transportation matching system, features associated with a transportation request received from a requestor computing device;
   determining, utilizing a neural network, one or more wait time-based pickup probabilities for the requestor computing device in association with the transportation request from the features associated with the transportation request, wherein the neural network is trained by:
   generating a predicted training pickup probability utilizing the neural network from raw pickup training data;
   determining a measure of loss by utilizing a loss function to compare the predicted training pickup probability with a ground truth pickup probability marker; and
   modifying parameters of the neural network based on the measure of loss;
   generating, based at least in part on the one or more wait time-based pickup probabilities for the requestor computing device in association with the transportation request, a customized wait time period for the transportation request for a provider computing device associated with the transportation request; and
   providing, for display on the provider computing device associated with the transportation request, a wait time indicator that counts down the customized wait time period.

2. The method as recited in claim 1, wherein identifying features associated with the transportation request comprises identifying one or more of: an indication of whether an application associated with the requestor computing device is open, an indication of remaining battery power associated with the requestor computing device, an indication of whether the requestor computing device is moving, a distance between the requestor computing device and the provider computing device, a transportation matching system user history associated with the requestor computing device, a transportation matching system user history associated with the provider computing device, a transportation matching system history associated with a pickup location specified by the transportation request.

3. The method as recited in claim 1, further comprising, in response to determining that the wait time indicator has counted down the customized wait time period, enabling a no-show option within a display of the provider computing device.

4. The method as recited in claim 1, wherein determining the one or more wait time-based pickup probabilities for the requestor computing device in association with the transportation request comprises:
generating an input vector based on the transportation request;
providing the input vector to the neural network; and
generating, utilizing the neural network, the one or more wait time-based pickup probabilities representing a probability that a pickup associated with the transportation request will occur within a given wait time period.

5. The method as recited in claim 1, further comprising:
detecting, after generating the customized wait time period for the transportation request for the provider computing device, fraudulent activity associated with the provider computing device; and
in response to the detected fraudulent activity, disabling one or more features of a transportation matching system application on the provider computing device.

6. The method as recited in claim 5, wherein:
detecting the fraudulent activity associated with the provider computing device comprises detecting at least one of a loss of network connectivity associated with the provider computing device, or that a current location of the provider computing device is outside a threshold distance from a pickup location associated with the transportation request; and
disabling the one or more features of the transportation matching system application on the provider computing device comprises one or more of disabling a user interface associated with the transportation matching system application on the provider computing device, pausing a progression of the customized wait time period, disabling an option to cancel the transportation request, or disabling a wait time indicator displayed within the transportation matching system application on the provider computing device.

7. The method as recited in claim 1, wherein:
determining the one or more wait time-based pickup probabilities for the requestor computing device in association with the transportation request comprises:
determining a standard probability that a pickup associated with the transportation request will occur within a standard pickup wait time period, and
determining an incremental probability that the pickup associated with the transportation request will occur within an incremental wait time period; and
further generating the customized wait time period for the transportation request based on the incremental wait time period.

8. A system comprising:
at least one processor; and
at least one non-transitory computer-readable storage medium storing instructions thereon that, when executed by the at least one processor, cause the system to:
identify features associated with a transportation request received from a requestor computing device;
determine, utilizing a machine learning model, one or more wait time-based pickup probabilities for the requestor computing device in association with the transportation request from the features associated with the transportation request, wherein the machine learning model is trained by:
generating a predicted training pickup probability utilizing the machine learning model from raw pickup training data;
determining a measure of loss from the predicted training pickup probability and a ground truth pickup probability marker; and
modifying parameters of the machine learning model based on the measure of loss;
generate, based at least in part on the one or more wait time-based pickup probabilities for the requestor computing device in association with the transportation request, a customized wait time period for the transportation request for a provider computing device associated with the transportation request; and
provide, for display on the provider computing device associated with the transportation request, a wait time indicator that counts down the customized wait time period.

9. The system as recited in claim 8, further storing instructions thereon that, when executed by the at least one processor, cause the system to identify the features associated with the transportation request by identifying one or more of: an indication of whether an application associated with the requestor computing device is open, an indication of remaining battery power associated with the requestor computing device, an indication of whether the requestor computing device is moving, a distance between the requestor computing device and the provider computing device, a transportation matching system user history associated with the requestor computing device, a transportation matching system user history associated with the provider computing device, a transportation matching system history associated with a pickup location specified by the transportation request.

10. The system as recited in claim 9, further storing instructions thereon that, when executed by the at least one processor, cause the system to, in response to determining that the wait time indicator has counted down the customized wait time period, enable a no-show option within a display of the provider computing device.

11. The system as recited in claim 10, wherein the machine learning model comprises a neural network and further storing instructions thereon that, when executed by the at least one processor, cause the system to:
determine the one or more wait time-based pickup probabilities for the requestor computing device in association with the transportation request by:
generating an input vector based on the transportation request and a predetermined wait time period; and
providing the input vector to the neural network; and
generate, utilizing the neural network, the one or more wait time-based pickup probabilities representing a probability that a pickup associated with the transportation request will occur within the predetermined wait time period.

12. The system as recited in claim 11, further storing instructions thereon that, when executed by the at least one processor, cause the system to:
detect, after generating the customized wait time period for the transportation request for the provider computing device, fraudulent activity associated with the provider computing device; and
in response to the detected fraudulent activity, disable features of a transportation matching system application on the provider computing device.

13. The system as recited in claim 12, further storing instructions thereon that, when executed by the at least one processor, cause the system to detect the fraudulent activity associated with the provider computing device by detecting at least one of a loss of network connectivity associated with the provider computing device, and a current location of the provider computing device that is outside a threshold distance from the pickup location associated with the transportation request; and disable the features of the transportation matching system application on the provider computing device by one or more of: disabling a user interface associated with the transportation matching system application on the provider computing device, or disabling a wait time indicator displayed within the transportation matching system application on the provider computing device.

14. The system as recited in claim 13, further storing instructions thereon that, when executed by the at least one processor, cause the system to determine, based on the features associated with the transportation request, the one or more wait time-based pickup probabilities for the requestor computing device in association with the transportation request by:

determining a standard probability that a pickup associated with the transportation request will occur within a standard pickup wait time period, and determining an incremental probability that the pickup associated with the transportation request will occur within an incremental wait time period; and generate the customized wait time period for the transportation request based at least in part on the incremental probability.

15. A non-transitory computer-readable medium storing instructions thereon that, when executed by at least one processor, cause a computer system to:

identify features associated with a transportation request received from a requestor computing device;

determine, utilizing a machine learning model, one or more wait time-based pickup probabilities for the requestor computing device in association with the transportation request from the features associated with the transportation request, wherein the machine learning model is trained by:

generating a predicted training pickup probability utilizing the machine learning model from raw pickup training data;

determining a measure of loss from the predicted training pickup probability and a ground truth pickup probability marker; and modifying parameters of the machine learning model based on the measure of loss;

generate, based at least in part on the one or more wait time-based pickup probabilities for the requestor computing device in association with the transportation request, a customized wait time period for the transportation request for a provider computing device associated with the transportation request; and provide, for display on the provider computing device associated with the transportation request, a wait time indicator that counts down the customized wait time period.

16. The non-transitory computer-readable medium as recited in claim 15, further storing instructions thereon that, when executed by the at least one processor, cause the computer system to, in response to determining that the wait time indicator has counted down the customized wait time period, enable a no-show option within a display of the provider computing device.

17. The non-transitory computer-readable medium as recited in claim 16, wherein the machine learning model comprises a neural network and further storing instructions thereon that, when executed by the at least one processor, cause the computer system to:

determine the one or more wait time-based pickup probabilities for the requestor computing device in association with the transportation request by:

generating an input vector based on the transportation request and a predetermined wait time period; and providing the input vector to the neural network, and generate, utilizing the neural network, the one or more wait time-based pickup probabilities representing a probability that a pickup associated with the transportation request will occur within the predetermined wait time period.

18. The non-transitory computer-readable medium as recited in claim 17, further storing instructions thereon that, when executed by the at least one processor, cause the computer system to:

detect after generating the customized wait time period for the transportation request for the provider computing device, fraudulent activity associated with the provider computing device; and in response to the detected fraudulent activity, disable features of a transportation matching system application on the provider computing device.

19. The non-transitory computer-readable medium as recited in claim 18, further storing instructions thereon that, when executed by the at least one processor, cause the computer system to:

detect the fraudulent activity associated with the provider computing device by detecting at least one of a loss of network connectivity associated with the provider computing device, and a current location of the provider computing device that is outside a threshold distance from a pickup location associated with the transportation request; and disable features of the transportation matching system application on the provider computing device by one or more of: disabling a user interface associated with the transportation matching system application on the provider computing device, or disabling a wait time indicator displayed within the transportation matching system application on the provider computing device.

20. The non-transitory computer-readable medium as recited in claim 19, further storing instructions thereon that, when executed by the at least one processor, cause the computer system to:

determine, based on the features associated with the transportation request, the one or more wait time-based pickup probabilities for the requestor computing device in association with the transportation request by:

determining a standard probability that a pickup associated with the transportation request will occur within a standard pickup wait time period, and determining an incremental probability that the pickup associated with the transportation request will occur within an incremental wait time period; and generate the customized wait time period for the transportation request based at least in part on the incremental probability.

* * * * *